US012441117B2

(12) United States Patent
Nei et al.

(10) Patent No.: US 12,441,117 B2
(45) Date of Patent: Oct. 14, 2025

(54) LIQUID ACCOMMODATION BODY

(71) Applicant: SEIKO EPSON CORPORATION, Tokyo (JP)

(72) Inventors: Azusa Nei, Shiojiri (JP); Satoru Kobayashi, Shiojiri (JP); Jun Shimazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 18/329,966

(22) Filed: Jun. 6, 2023

(65) Prior Publication Data

US 2023/0391096 A1 Dec. 7, 2023

(30) Foreign Application Priority Data

Jun. 7, 2022 (JP) ................................ 2022-092086

(51) Int. Cl.
*B41J 2/175* (2006.01)

(52) U.S. Cl.
CPC .................................. *B41J 2/1754* (2013.01)

(58) Field of Classification Search
CPC .... B41J 2/175; B41J 2/17506; B41J 2/17509; B41J 2/1752; B41J 2/17523; B41J 2/1754; B41J 2/17553; B41J 2/17566
See application file for complete search history.

(56) References Cited

U.S. PATENT DOCUMENTS

| | | | | |
|---|---|---|---|---|
| 7,469,989 | B2 * | 12/2008 | Silverbrook | B41J 2/17506 347/65 |
| 10,427,412 | B2 * | 10/2019 | Okude | B41J 2/1752 |
| 11,192,380 | B2 * | 12/2021 | Ishizawa | B41J 2/17523 |
| 2014/0063140 | A1 | 3/2014 | Shimizu et al. | |
| 2018/0237190 | A1 | 8/2018 | Iwasaki | |
| 2018/0272723 | A1 * | 9/2018 | Shinada | B41J 2/17509 |
| 2020/0307236 | A1 | 10/2020 | Nakazawa et al. | |
| 2022/0258479 | A1 * | 8/2022 | Tsukuda | B41J 2/1754 |

FOREIGN PATENT DOCUMENTS

| | | | |
|---|---|---|---|
| JP | 2014-061691 | A | 4/2014 |
| JP | 2018-135107 | A | 8/2018 |
| JP | 2019-034740 | A | 3/2019 |
| JP | 2020-163716 | A | 10/2020 |

* cited by examiner

*Primary Examiner* — Anh T Vo
(74) *Attorney, Agent, or Firm* — WORKMAN NYDEGGER

(57) ABSTRACT

A liquid accommodation body to be connected to a liquid ejection device for ejecting liquid, the liquid accommodation body including a container that has an inlet section with an inlet through which liquid is introduced and that contains the liquid; a cap that seals the inlet by covering the inlet section; and a lead out section that leads liquid to the liquid ejection device; wherein when the cap seals the inlet, the cap and the inlet section configure an atmospheric release path that enables the inlet to connect to atmosphere.

10 Claims, 22 Drawing Sheets

LIQUID ACCOMMODATION BODY

The present application is based on, and claims priority from JP Application Serial Number 2022-092086, filed Jun. 7, 2022, the disclosure of which is hereby incorporated by reference herein in its entirety.

BACKGROUND

1. Technical Field

The present disclosure relates to, for example, a liquid accommodation body.

2. Related Art

JP-A-2020-163716 describes a liquid accommodation body that is connected to a liquid ejection device. The liquid accommodation body has a container that contains liquid and a cap that is attached to the container. An upper wall of the container has an inlet through which liquid is introduced. Liquid is introduced into the container through the inlet. The cap seals the inlet. In addition to the inlet, an atmospheric release path is provided in the upper wall of the container to connect the inside of the container to atmosphere. The atmospheric release path enables liquid to be smoothly supplied from the liquid accommodation body to the liquid ejection device.

In the liquid accommodation body described in JP-A-2020-163716, the atmospheric release path opens upward at the upper wall of the container. Therefore, there is a possibility that foreign matter from outside the container may enter the container through the atmospheric release path.

SUMMARY

A liquid accommodation body that solves the above problem is a liquid accommodation body to be connected to a liquid ejection device for ejecting liquid, the liquid accommodation body including a container that has an inlet section with an inlet through which liquid is introduced and that contains the liquid; a cap that seals the inlet by covering the inlet section; and a lead out section that leads liquid to the liquid ejection device, wherein when the cap seals the inlet, the cap and the inlet section configure an atmospheric release path that connects the inlet to atmosphere.

DESCRIPTION OF EMBODIMENTS

Hereinafter, an embodiment of a liquid accommodation body to be connected to a liquid ejection device will be described with reference to the drawings. First, the liquid ejection device will be described. The liquid ejection device is, for example, an inkjet printer that records an image such as a character or a photograph by ejecting ink, which is an example of liquid, onto a medium such as paper, cloth, vinyl, a plastic component, or a metal component.

Liquid Ejection Device

Figure 1:
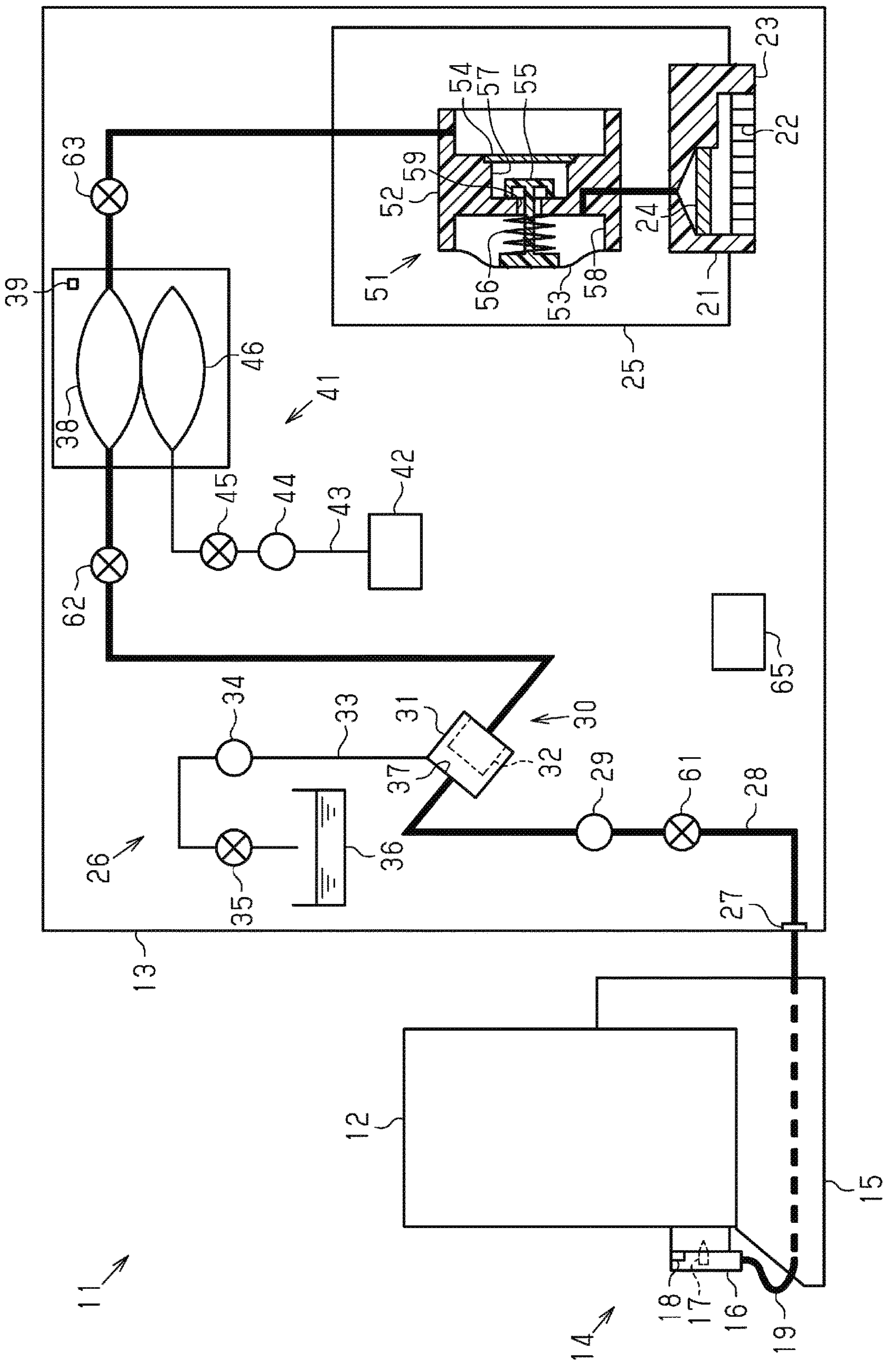
FIG. 1 is a schematic diagram showing an embodiment of a liquid ejection device connected to a liquid accommodation body.
Figure 2:
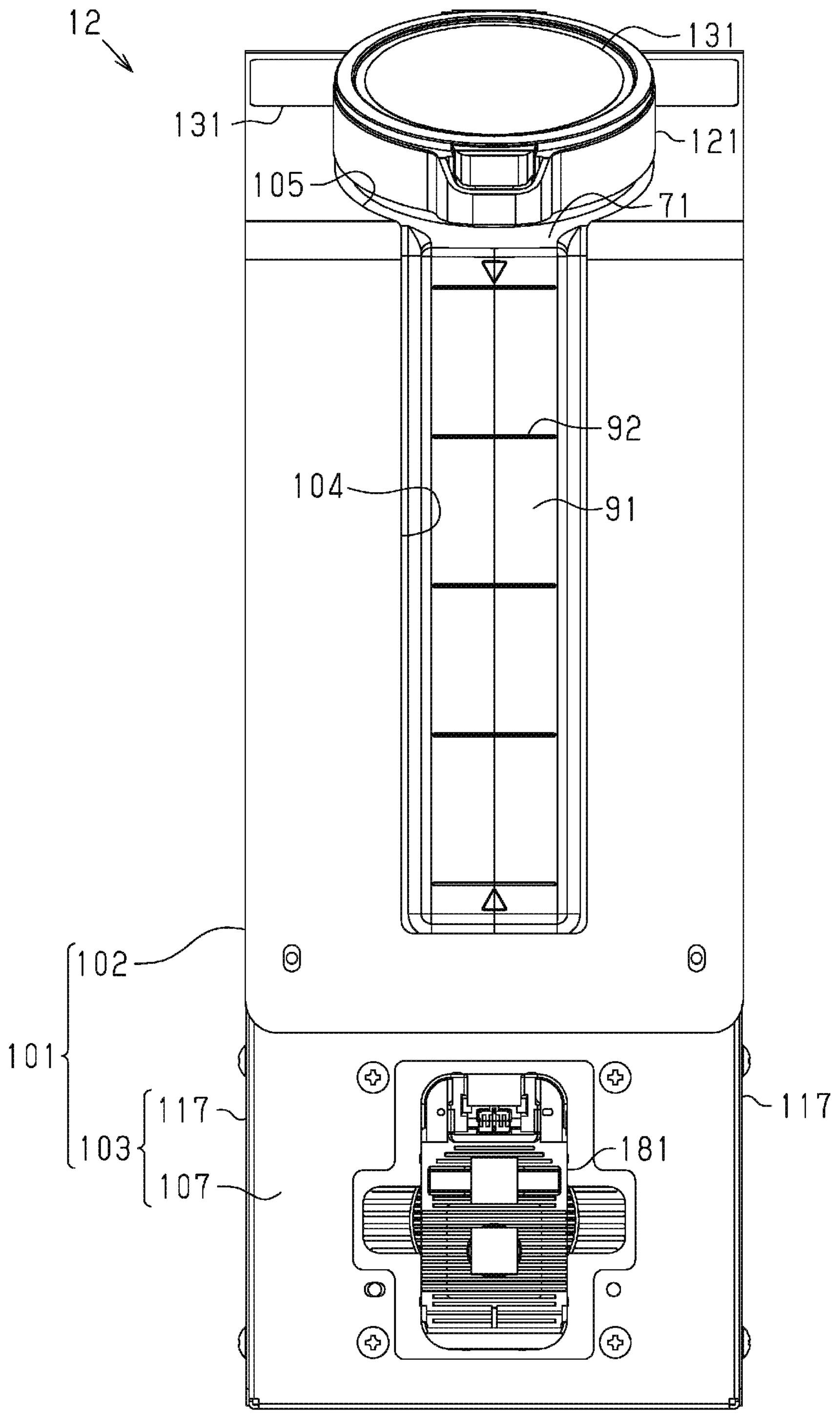
FIG. 2 is a front view of the liquid accommodation body.
Figure 3:
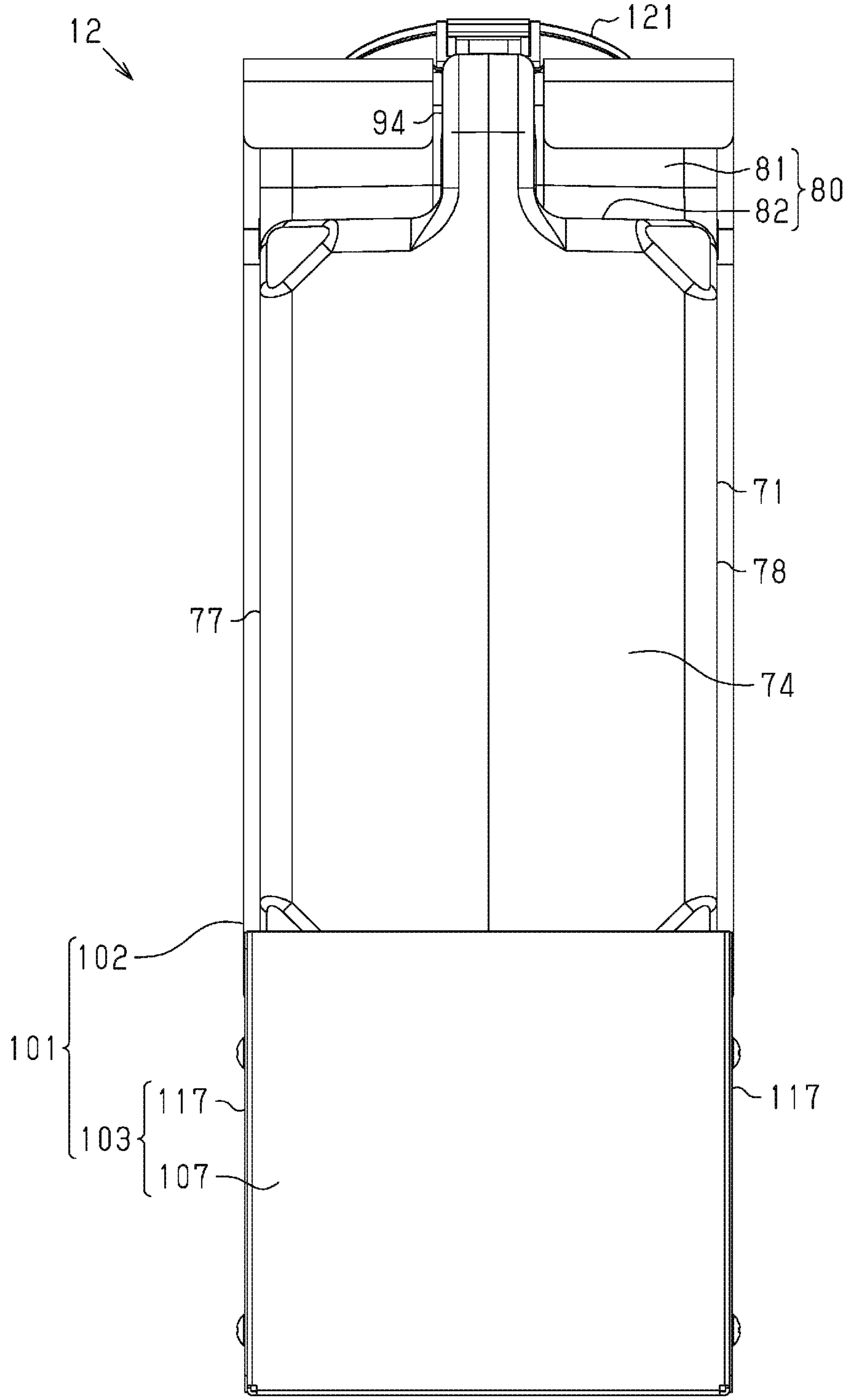
FIG. 3 is a back view of the liquid accommodation body.
Figure 4:
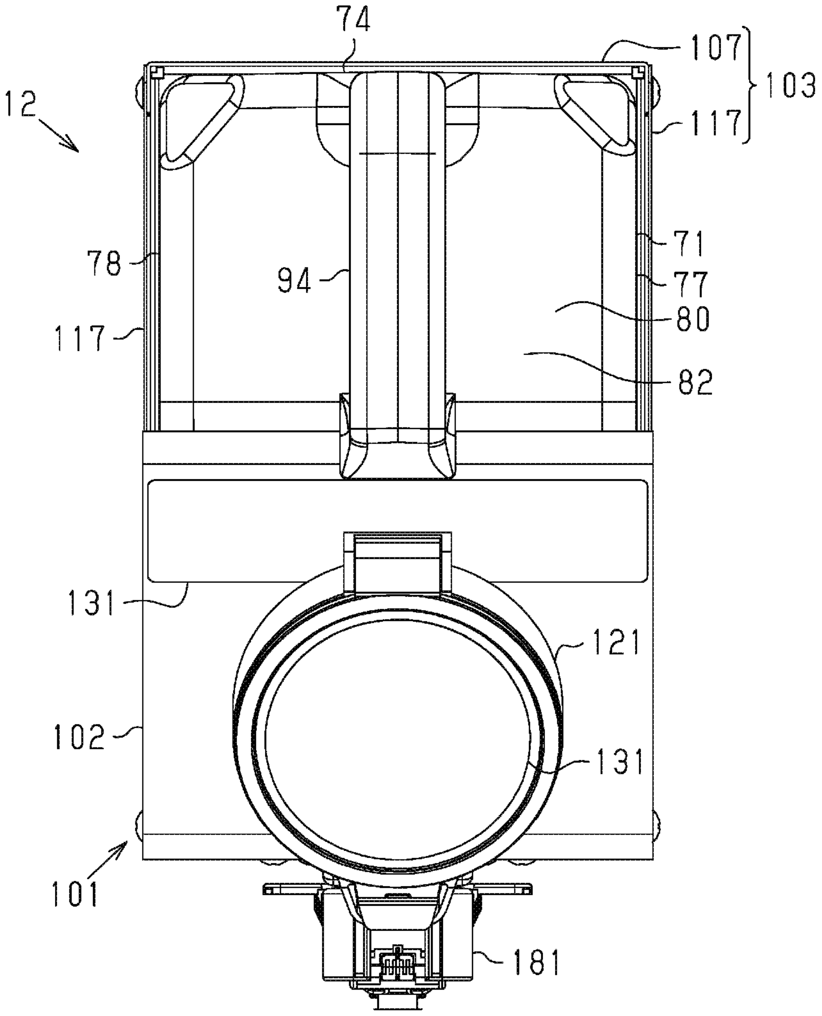
FIG. 4 is a top view of the liquid accommodation body.
Figure 5:
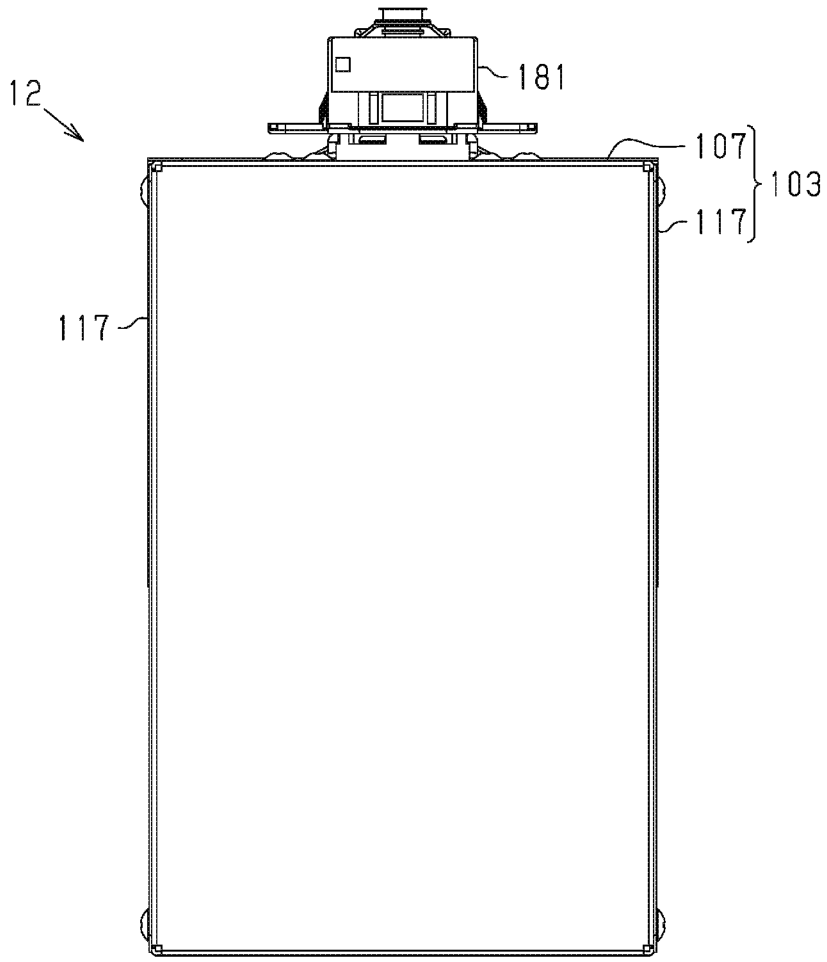
FIG. 5 is a bottom view of the liquid accommodation body.
Figure 6:
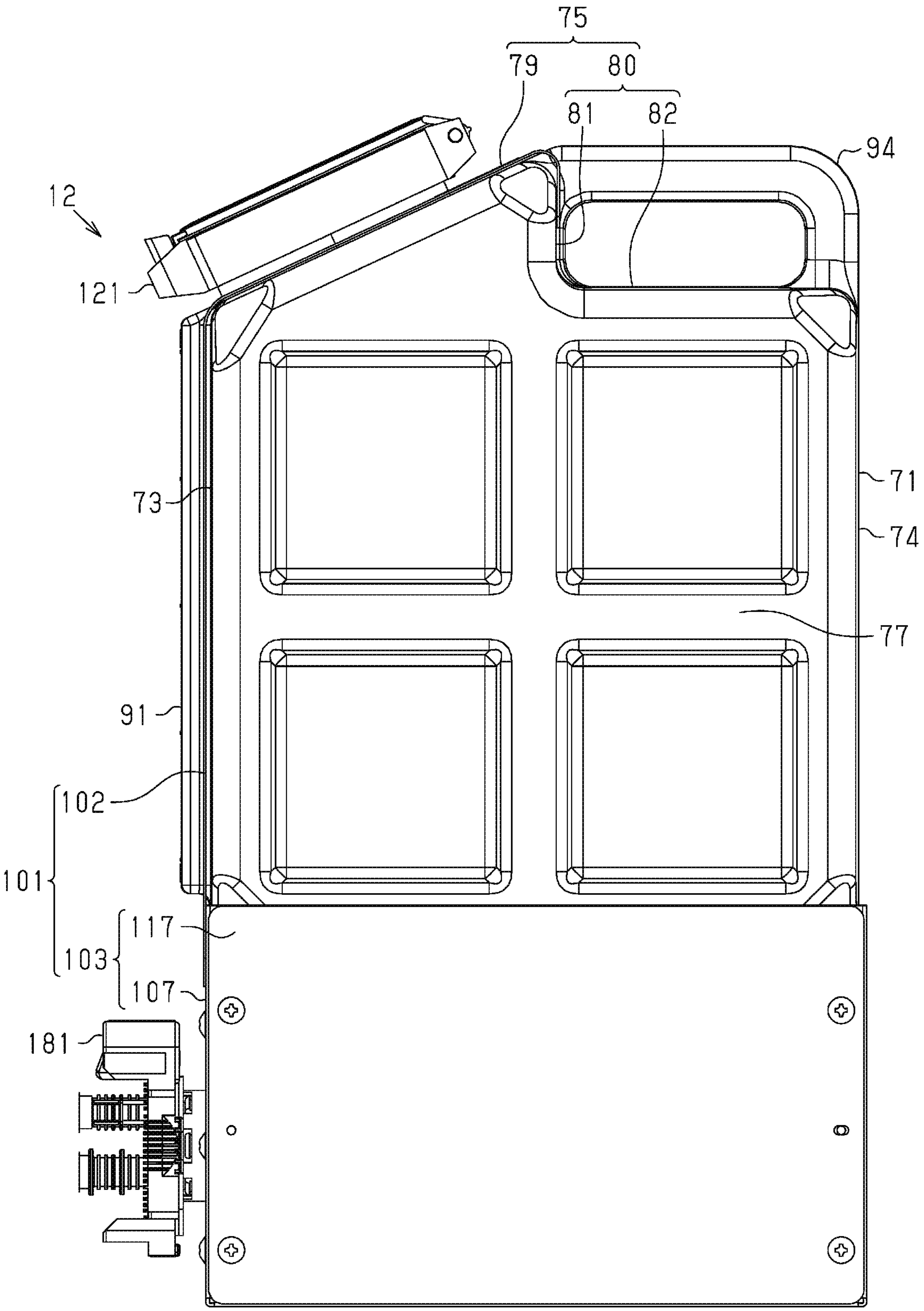
FIG. 6 is a right side view of the liquid accommodation body.
Figure 7:
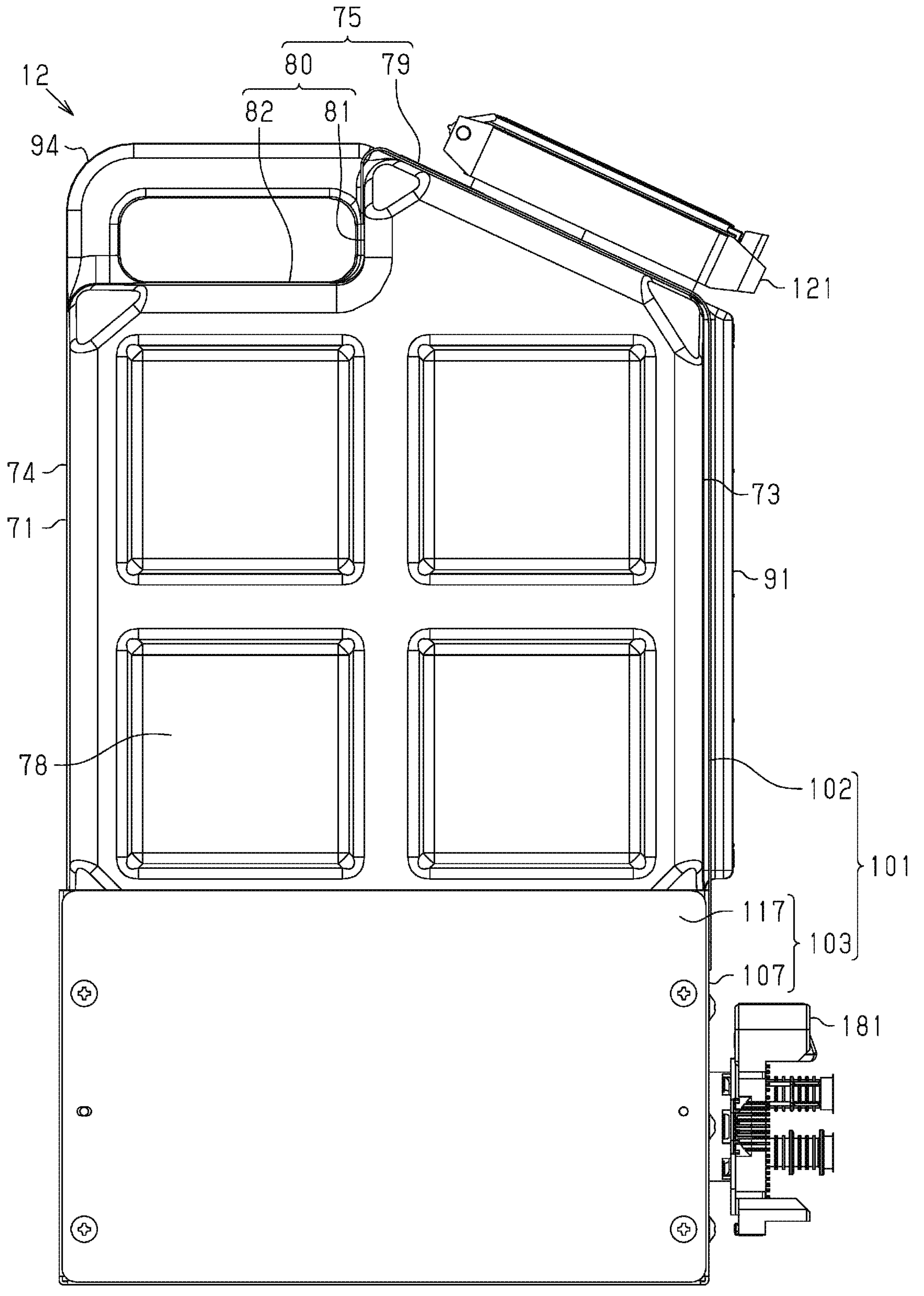
FIG. 7 is a left side view of the liquid accommodation body.

As shown in FIG. 1, a liquid ejection device 11 is connected to a liquid accommodation body 12. The liquid accommodation body 12 is configured to contain liquid. The liquid accommodation body 12 will be described in detail after the liquid ejection device 11 is described.

The liquid ejection device 11 has a housing 13. The liquid ejection device 11 has a coupler 14. The coupler 14 is configured to be connected to the liquid accommodation body 12. By connecting the coupler 14 to the liquid accommodation body 12, the liquid ejection device 11 is connected to the liquid accommodation body 12. The coupler 14 is located outside the housing 13, for example.

The coupler 14 may have a base 15. The liquid accommodation body 12 is mounted on the base 15. The coupler 14 has a connection member 16. The connection member 16 is a member that is connected to the liquid accommodation body 12 by contacting the liquid accommodation body 12. The connection member 16 is, for example, an adapter. The connection member 16 can be attached to and detached from the liquid accommodation body 12.

The connection member 16 has an introduction member 17. The introduction member 17 is a member into which the liquid is introduced from the liquid accommodation body 12. The introduction member 17 is, for example, an insertion needle that is inserted into the liquid accommodation body 12. The connection member 16 is connected to the liquid accommodation body 12 by inserting the introduction member 17 into the liquid accommodation body 12.

The connection member 16 has a detection member 18. The detection member 18 is a member for detecting a connection between the liquid accommodation body 12 and the coupler 14. The detection member 18 is, for example, a terminal that is electrically connected to the liquid accommodation body 12. By detecting the connection between the liquid accommodation body 12 and the coupler 14 by the detection member 18, the liquid ejection device 11 knows that the coupler 14 is connected to the liquid accommodation body 12.

The coupler 14 has a connection tube 19. The connection tube 19 is a flow path through which liquid flows from the connection member 16. The connection tube 19 includes, for example, a tube. The connection tube 19 is connected to the connection member 16. By connecting the connection member 16 to the liquid accommodation body 12, liquid flows from the liquid accommodation body 12 to the connection tube 19. The connection tube 19, for example, extends outside the housing 13.

The liquid ejection device 11 has an ejection section 21. The ejection section 21 is housed in the housing 13. The ejection section 21 is configured to eject liquid. The ejection section 21 ejects the liquid supplied from the liquid accommodation body 12. The ejection section 21 may eject one type of liquid supplied from one liquid accommodation body 12, or may eject multiple types of liquid supplied from multiple liquid accommodation bodies 12. The ejection section 21 is, for example, a head. The ejection section 21 has an opening surface 23 through which one or more nozzles 22 open. The ejection section 21 ejects liquid from the nozzle 22 onto a medium.

The ejection section 21 may have an ejection filter 24. The ejection filter 24 collects air bubbles, dust, and other foreign matter from the liquid supplied from the liquid accommodation body 12. The ejection filter 24 collects foreign matter from the liquid before the liquid reaches the nozzle 22.

The liquid ejection device 11 may have a carriage 25. The carriage 25 is housed in the housing 13. The carriage 25 mounts the ejection section 21. The carriage 25 scans across the medium. Images are recorded on the medium by the carriage 25 scanning while the ejection section 21 ejects liquid. In this case, the liquid ejection device 11 is, for example, a serial printer. The liquid ejection device 11 may be, for example, a line printer in which the ejection section 21 can eject the liquid simultaneously across the width of the medium.

The liquid ejection device 11 has a supply mechanism 26. The supply mechanism 26 is housed in the housing 13. The supply mechanism 26 is a mechanism that supplies liquid to the ejection section 21. The supply mechanism 26 is configured to supply liquid from the liquid accommodation body 12 to the ejection section 21.

The supply mechanism 26 has a joint 27. The joint 27 is connected to the coupler 14. More specifically, the joint 27 is connected to the connection tube 19. The joint 27 may be detachable from the connection tube 19. By connecting the connection tube 19 to the joint 27, the flow path extends from outside to inside of the housing 13.

The supply mechanism 26 has a supply tube 28. The supply tube 28 is a flow path through which liquid flows from the coupler 14. The supply tube 28 includes, for example, a tube. The supply tube 28 is connected to the joint 27 and the ejection section 21.

The supply mechanism 26 has a feed pump 29. The feed pump 29 is located at an intermediate part of the supply tube 28. The feed pump 29 moves liquid from upstream to downstream in the supply tube 28. In other words, the feed pump 29 moves the liquid from the joint 27 toward the ejection section 21. The feed pump 29 is, for example, a diaphragm pump. The feed pump 29 may be, for example, a syringe-type pump or a tube pump.

The supply mechanism 26 has a collection section 30. The collection section 30 is configured to collect foreign matter from the liquid flowing through the supply tube 28. The collection section 30 may be a defoaming module that removes air bubbles from the liquid flowing through the supply tube 28. The collection section 30 is located in the middle of the supply tube 28. The collection section 30 is located downstream of the feed pump 29 in the supply tube 28. The collection section 30 has, for example, a case 31, a feed filter 32, a discharge tube 33, a pressure sensor 34, a discharge valve 35, and a waste liquid tank 36.

The case 31 is located at an intermediate part of the supply tube 28. The case 31 defines a filter chamber 37. The liquid flowing through the supply tube 28 flows into the filter chamber 37. The case 31 houses the feed filter 32. The feed filter 32 is located in the filter chamber 37. The feed filter 32 collects foreign matter from the liquid flowing through the supply tube 28.

The discharge tube 33 is a flow path that discharges air bubbles flowing through the filter chamber 37 along with the liquid. The discharge tube 33 is connected to the case 31 and the waste liquid tank 36. The upstream end of the discharge tube 33 connects to the filter chamber 37. The downstream end of the discharge tube 33 is inserted into the waste liquid tank 36. The discharge tube 33 is connected to the case 31 at a position upstream of the feed filter 32. By connecting the discharge tube 33 at the highest position in the filter chamber 37 and at a corner of the filter chamber 37, air bubbles can be discharged efficiently.

The pressure sensor 34 is located at an intermediate part of the discharge tube 33. The pressure sensor 34 detects the pressure inside the supply tube 28. The discharge valve 35 is located at an intermediate part of the discharge tube 33. The discharge valve 35 is located downstream of the pressure sensor 34 in the discharge tube 33. The discharge valve 35 is located between the pressure sensor 34 and the waste liquid tank 36. The discharge valve 35 opens and closes the discharge tube 33. When the discharge valve 35 is opened, liquid, air bubbles, and the like are discharged from the discharge tube 33 into the waste liquid tank 36. The waste liquid tank 36 stores the liquid discharged through the discharge tube 33.

The supply mechanism 26 has an intermediate storage section 38. The intermediate storage section 38 is configured to store liquid. The intermediate storage section 38 is located at an intermediate part of the supply tube 28. The intermediate storage section 38 is located downstream of the collection section 30 in the supply tube 28. The intermediate storage section 38 is, for example, a bag made of flexible member. The intermediate storage section 38 expands or contracts depending to the amount of liquid stored therein.

The supply mechanism 26 may have a liquid amount sensor 39. The liquid amount sensor 39 detects, for example, the amount of liquid stored by the intermediate storage section 38. The liquid amount sensor 39 detects the amount of liquid in the intermediate storage section 38, for example, based on a degree of swelling of the intermediate storage section 38. The liquid amount sensor 39 monitors the degree of swelling of the intermediate storage section 38, for example, by measuring a distance to the intermediate storage section 38.

The supply mechanism 26 has a pressurizing mechanism 41. The pressurizing mechanism 41 is configured to pressurize the liquid stored in the intermediate storage section 38. The pressurizing mechanism 41 supplies liquid from the intermediate storage section 38 to the ejection section 21 by pressurizing the liquid stored in the intermediate storage section 38.

The pressurizing mechanism 41 pressurizes the liquid stored in the intermediate storage section 38 by pressing the intermediate storage section 38. The pressurizing mechanism 41 has, for example, an air feed section 42, an air feed tube 43, an air pressure sensor 44, an air valve 45, and a pressing section 46.

The air feed section 42 is configured to supply air to the pressing section 46. The air feed section 42 is, for example, an air pump. The air feed tube 43 is connected to the air feed section 42 and the pressing section 46. Air is supplied from the air feed section 42 to the pressing section 46 through the air feed tube 43.

The air pressure sensor 44 is located at an intermediate section of the air feed tube 43. The air pressure sensor 44 detects pressure in the air feed tube 43. The air valve 45 is located at an intermediate part of the air feed tube 43. The air valve 45 is located, for example, between the air pressure sensor 44 and the pressing section 46. The air valve 45 opens and closes the air feed tube 43. By opening the air valve 45, air is supplied from the air feed tube 43 to the pressing section 46.

The pressing section 46 is, for example, a bag made of a flexible member, similarly to the intermediate storage section 38. The pressing section 46 is located alongside the intermediate storage section 38. The pressing section 46 expands by the air supplied from the air feed tube 43. The expanded pressing section 46 presses the intermediate storage section 38. The pressing section 46 pressurizes the liquid stored in the intermediate storage section 38 by pressurizing the intermediate storage section 38.

The supply mechanism 26 has a pressure adjustment mechanism 51. The pressure adjustment mechanism 51 is located in the middle of the supply tube 28. The pressure adjustment mechanism 51 is located downstream of the intermediate storage section 38 in the supply tube 28. The pressure adjustment mechanism 51 is located between the intermediate storage section 38 and the ejection section 21. The pressure adjustment mechanism 51 may be mounted on the carriage 25.

The pressure adjustment mechanism 51 is configured to adjust the pressure in the ejection section 21. The pressure adjustment mechanism 51 has, for example, a main body 52, a diaphragm 53, a valve filter 54, a valve body 55, and a spring 56.

The main body 52 defines a feed chamber 57, a pressure chamber 58, and a through opening 59. Liquid flows into the feed chamber 57 from the intermediate storage section 38. The liquid in the feed chamber 57 is pressurized by the intermediate storage section 38. Liquid flows into the pressure chamber 58 from the feed chamber 57. The liquid in the pressure chamber 58 is supplied to the ejection section 21. The through opening 59 connects to the feed chamber 57 and the pressure chamber 58.

The diaphragm 53 is attached to the main body 52. The pressure chamber 58 is defined by the diaphragm 53. In other words, the diaphragm 53 constitutes a part of the wall surfaces which define the pressure chamber 58. The volume of pressure chamber 58 changes as the diaphragm 53 deforms. The diaphragm 53 is subjected to atmospheric pressure. The diaphragm 53 is subjected to the pressure of the pressure chamber 58. Therefore, the diaphragm 53 deforms in response to changes in the pressure difference between the pressure in the pressure chamber 58 and atmospheric pressure.

The valve filter 54 is located in the feed chamber 57. The valve filter 54 collects foreign matter from the liquid. The valve body 55 is inserted into the through opening 59. The valve body 55 is located over the feed chamber 57 and the pressure chamber 58. The valve body 55 normally closes the through opening 59. By opening the through opening 59 by the valve body 55, liquid flows from the feed chamber 57 into the pressure chamber 58. One end of the valve body 55 contacts the diaphragm 53.

The spring 56 is located in the pressure chamber 58. The spring 56 contacts the main body 52 and the valve body 55. The spring 56 pushes the valve body 55 so that the through opening 59 is closed by the valve body 55. At this time, the diaphragm 53 is pushed by the valve body 55 so that the volume of the pressure chamber 58 is increased.

In the pressure adjustment mechanism 51, when the pressure in the pressure chamber 58 is lower than atmospheric pressure and the pressure difference between the pressure in the pressure chamber 58 and atmospheric pressure is larger than a predetermined pressure, the diaphragm 53 pushes the valve body 55 against the spring 56. By this, the through opening 59 is opened. As a result, liquid flows from the feed chamber 57 into the pressure chamber 58.

As liquid flows from the feed chamber 57 into the pressure chamber 58, the pressure in the pressure chamber 58 increases. When the pressure difference between the pressure in the pressure chamber 58 and atmospheric pressure becomes less than a predetermined pressure, the valve body 55 closes the through opening 59. Thus, the pressure adjustment mechanism 51 adjusts the pressure in the ejection section 21 by adjusting the pressure in the pressure chamber 58.

The supply mechanism 26 has one or more open-close valves in the middle of the supply tube 28. The supply mechanism 26 has, for example, a feed valve 61, an upstream valve 62, and a downstream valve 63. The feed valve 61, the upstream valve 62, and the downstream valve 63 each open and close the supply tube 28. The feed valve 61 is located between the joint 27 and the feed pump 29. The upstream valve 62 is located between the collection section 30 and the intermediate storage section 38. The downstream valve 63 is located between the intermediate storage section 38 and the pressure adjustment mechanism 51.

The liquid ejection device 11 has a control section 65. The control section 65, for example, comprehensively controls the drive of each mechanism in the liquid ejection device 11. The control section 65 controls, for example, the ejection section 21, the carriage 25, the supply mechanism 26 and the like.

The control section 65 may be configured with one or more processors that execute various processes according to a computer program. The control section 65 may be configured with one or more dedicated hardware circuits to perform at least some of the various processes. The control section 65 may be configured as a circuit that includes a combination of processor and hardware circuitry. The hardware circuit is, for example, application specific integrated circuits. The processor includes a CPU and a memory such as RAM and ROM. The memory stores program code or instructions configured to cause the CPU to execute a process. The memory, that is, the computer readable medium, includes any readable media that can be accessed by a general purpose or dedicated computer.

Liquid Accommodation Body

Next, the liquid accommodation body 12 will be described. The liquid accommodation body 12 is configured to contain liquid to be supplied to the liquid ejection device 11. The liquid accommodation body 12 is attached to and detached from the coupler 14. The coupler 14 is attached to the front of the liquid accommodation body 12. In the state where the coupler 14 is attached to the liquid accommodation body 12, the direction from the liquid accommodation body 12 to the coupler 14 is forward.

The liquid accommodation body 12 is located outside the housing 13. Therefore, the liquid accommodation body 12 is connected to the coupler 14 outside the housing 13. The liquid accommodation body 12 is connected to the coupler 14, for example, at a distance from the housing 13.

As shown in FIG. 2, FIG. 3, FIG. 4, FIG. 5, FIG. 6, FIG. 7, and FIG. 8, the liquid accommodation body 12 is, for example, a rectangular parallelepiped shape overall. In the liquid accommodation body 12, for example, the height is the largest of the width, the depth, and the height.

As shown in FIG. 8, FIG. 9, FIG. 10, and FIG. 11, the liquid accommodation body 12 has a container 71. The container 71 contains liquid. The container 71 has an accommodation chamber 72 that contains liquid. The container 71 is, for example, a rectangular parallelepiped shape overall. Therefore, the container 71 has a front surface 73, a rear surface 74, a top surface 75, a bottom surface 76, a right side surface 77, and a left side surface 78. All of the front surface 73, the rear surface 74, the top surface 75, the bottom surface 76, the right side surface 77, and the left side surface 78 face outward from the container 71.

The front surface 73 is a surface located forward in the container 71. The front surface 73 is a surface opposite from the rear surface 74. The front surface 73 connects to the top surface 75, the bottom surface 76, the right side surface 77, and the left side surface 78. The rear surface 74 is a surface located at the rear of the container 71. The rear surface 74 is a surface opposite from the front surface 73. The rear surface 74 connects to the top surface 75, the bottom surface 76, the right side surface 77, and the left side surface 78.

The top surface 75 is a surface located at the upper portion of the container 71. The top surface 75 is a surface opposite from the bottom surface 76. The top surface 75 connects to the front surface 73, the rear surface 74, the right side surface 77, and the left side surface 78. The top surface 75 includes an inclined surface 79. The inclined surface 79 faces upward. The inclined surface 79 faces forward. The inclined surface 79 is a portion of the top surface 75 that is located forward. The inclined surface 79 connects to the front surface 73. A lower end of the inclined surface 79 connects to the front surface 73. The inclined surface 79 is inclined at 25 degrees to the horizontal, for example, when the liquid accommodation body 12 is placed horizontally.

The top surface 75 includes a step surface 80. The step surface 80 is a surface that forms a step in the top surface 75. The step surface 80 is a portion of the top surface 75 that is located rearward. The step surface 80 connects to the inclined surface 79. The step surface 80 connects to the rear surface 74.

The step surface 80 includes a first surface 81 and a second surface 82. The first surface 81 connects to the inclined surface 79. Specifically, the first surface 81 connects to an upper end of the inclined surface 79. The first surface 81 extends vertically, for example. The first surface 81 extends downward from the upper end of the inclined surface 79. Therefore, un upper end of the first surface 81 connects to the upper end of the inclined surface 79. The second surface 82 connects to the first surface 81. Specifically, the second surface 82 connects to a lower end of the first surface 81. The second surface 82 extends horizontally, for example. The second surface 82 extends backward from the lower end of the first surface 81. The second surface 82 connects to the rear surface 74.

The bottom surface 76 is a surface located at a lower portion of the container 71. The bottom surface 76 is a surface opposite from the top surface 75. The bottom surface 76 connects to the front surface 73, the rear surface 74, the right side surface 77, and the left side surface 78. The right side surface 77 is a surface located right side in the container 71 when the front surface 73 is viewed from the front. The right side surface 77 is a surface opposite from the left side surface 78. The right side surface 77 connects to the front surface 73, the rear surface 74, the top surface 75, and the bottom surface 76.

The left side surface 78 is a surface located at the left side in the container 71 when the front surface 73 is viewed from the front. The left side surface 78 is a surface opposite to the right side surface 77. The left side surface 78 connects to the front surface 73, the rear surface 74, the top surface 75, and the bottom surface 76.

The container 71 is made of a transparent or translucent material. The container 71 is made of, for example, polypropylene. The container 71 is produced by, for example, blow molding. By being manufactured by blow molding, the seams are reduced in the container 71, thus a possibility of liquid leakage is reduced.

Figure 10:
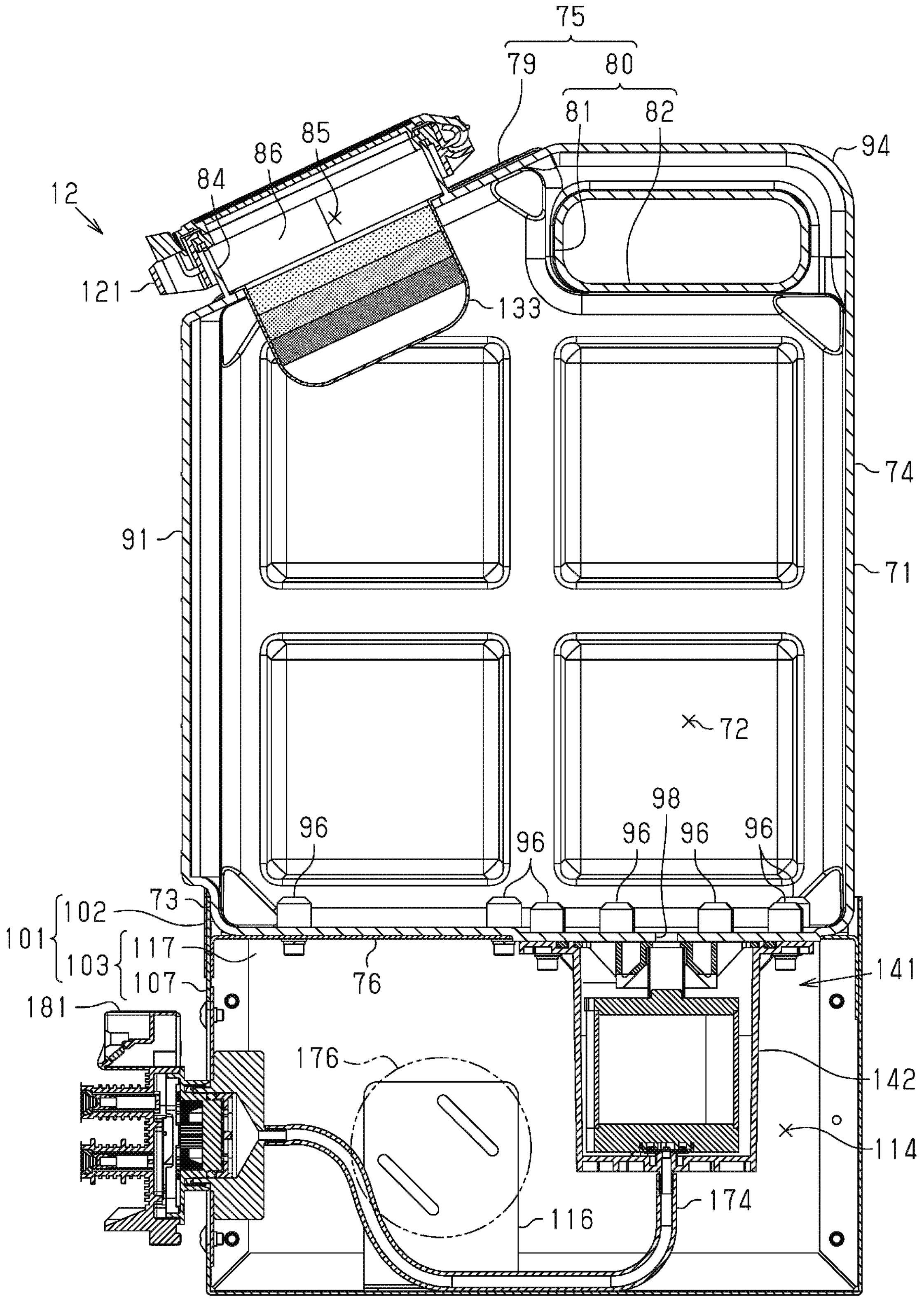
FIG. 10 is a cross-sectional view of the liquid accommodation body.

As shown in FIG. 10, the container 71 has an inlet section 84. The inlet section 84 is used to fill liquid. In the inlet section 84, an inlet 85 is opened. The inlet 85 is an opening through which liquid is introduced. The inlet 85 connects the inside of the container 71, that is, the housing chamber 72, to the outside of the container 71. Liquid is introduced into the accommodation chamber 72 through the inlet 85. This configuration enables the container 71 to be filled with liquid. The user continuously uses the liquid accommodation body 12 by refilling the container 71 with liquid.

The inlet section 84 is located at an upper portion of the container 71. The inlet section 84 is located, for example, on the top surface 75. Specifically, the inlet section 84 is located on the inclined surface 79. The inlet section 84 is, for example, a pipe extending vertically from the inclined surface 79.

Figure 12:
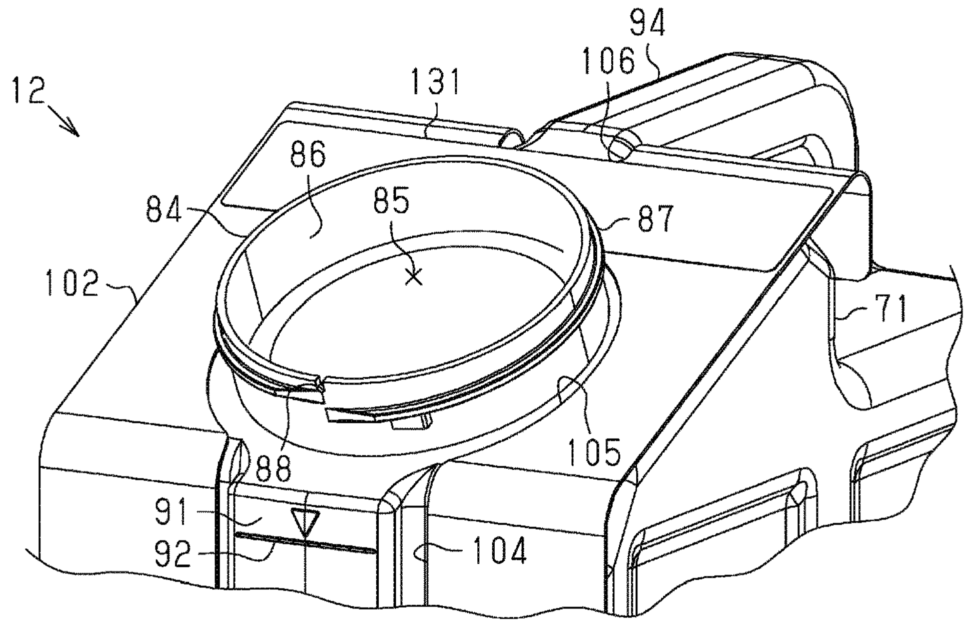
FIG. 12 is a perspective view showing an inlet section.

As shown in FIG. 12, the inlet section 84 has a peripheral wall 86. The peripheral wall 86 extends from the inclined surface 79. The peripheral wall 86, when viewed from a position facing the inclined surface 79, extends in a circular shape, for example. A space enclosed by the peripheral wall 86 is the inlet 85.

The inlet section 84 has a thread 87. The thread 87 is located on the peripheral wall 86. Specifically, the thread 87 is located on the outer peripheral surface of the peripheral wall 86. The thread 87 enables a cap 121, to be described later, to be attached to the inlet section 84.

In the peripheral wall 86, a through passage 88 is formed. The through passage 88 is an opening that penetrates the inlet section 84. The through passage 88 is formed, for example, by notching the tip of the peripheral wall 86. The through passage 88 may be a hole formed in the peripheral wall 86. The through passage 88 connects the space enclosed by the peripheral wall 86 to the space outside the peripheral wall 86. The through passage 88 connects the inlet 85 to atmosphere when the cap 121 seals the inlet 85. The through passage 88 enables the inside of the container 71 to connect to atmosphere even when the inlet 85 is sealed by the cap 121.

By locating the inlet section 84 on the inclined surface 79, it is easier for the user to introduce in liquid. For example, when introducing liquid from a bottle containing liquid into the liquid accommodation body 12, the user introduces the liquid in through the inlet 85 by tilting the bottle. If the inlet section 84 extends vertically from a horizontal surface, a flow distance that the liquid flows from the bottle to reach the inlet 85 will be longer. By extending the inlet section 84 vertically from the inclined surface 79, the flow distance can be shortened. This makes it easier for the user to fill liquid from the bottle to the liquid accommodation body 12. Therefore, when introducing liquid, it is less likely to spill.

Figure 9:
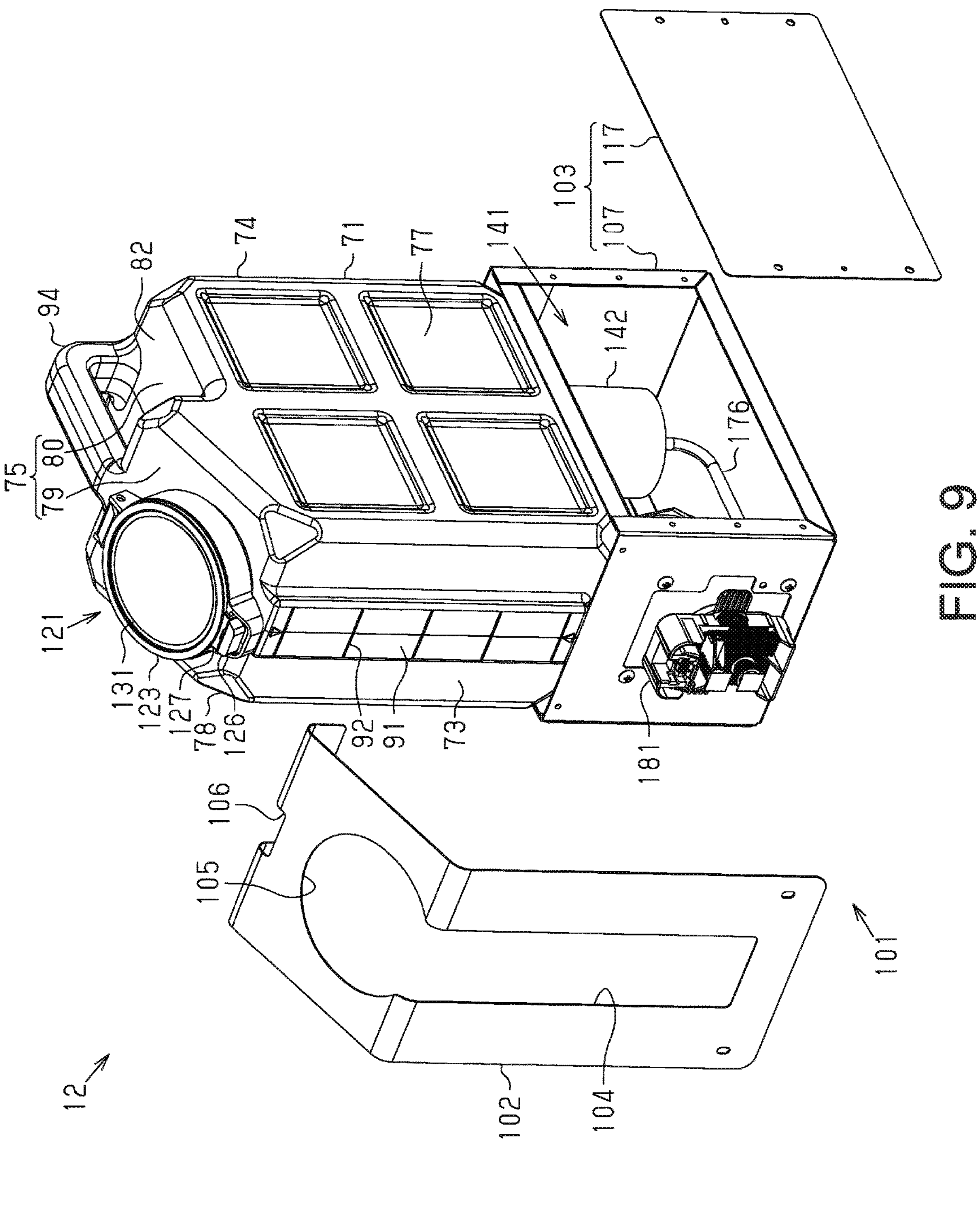
FIG. 9 is a perspective view of the liquid accommodation body in which a protection member is disassembled from FIG. 8.

As shown in FIG. 9 and FIG. 10, the container 71 has a visual check section 91. The visual check section 91 is configured to be able to see a liquid level of the liquid contained in the container 71. The visual check section 91 is a portion that is visible by the user to see the liquid level of the liquid contained in the container 71. The user monitors the amount of liquid contained in the container 71 by seeing the liquid level through the visual check section 91.

The visual check section 91 is located lower than the inlet section 84. The visual check section 91 is positioned so that it is aligned vertically with the inlet section 84 as the visual check section 91 is viewed the front. The visual check section 91 is located on the front surface 73, for example.

The visual check section 91 is configured to project forward from the front surface 73. The visual check section 91 is, for example, a convex portion projecting from the front surface 73. For example, the visual check section 91 extends in the vertical direction in the front surface 73. The visual check section 91 may have a scale 92. In this case, it is easier for the user to see the liquid amount through the visual check section 91.

The container 71 has a gripping section 94. The gripping section 94 is a portion of the container 71 that is gripped by the user. The gripping section 94 is, for example, a bar for a handle. The gripping section 94 is located at the same height as the inlet section 84 in the vertical direction. In other words, the gripping section 94 is positioned horizontally in line with the inlet section 84. The gripping section 94 is aligned with the inlet section 84 when the container 71 is viewed from above. The gripping section 94, like the inlet section 84, is located at the upper portion of the container 71. The gripping section 94 is located, for example, on the top surface 75. Specifically, the gripping section 94 is located on the step surface 80. The gripping section 94 extends from the first surface 81 and the second surface 82. One end of the gripping section 94 is located on the first surface 81, and the other end of the gripping section 94 is located on the second surface 82. The gripping section 94 extends from the first surface 81 to connect with the inclined surface 79. The gripping section 94 extends from the second surface 82 to connect with the rear surface 74.

Figure 11:
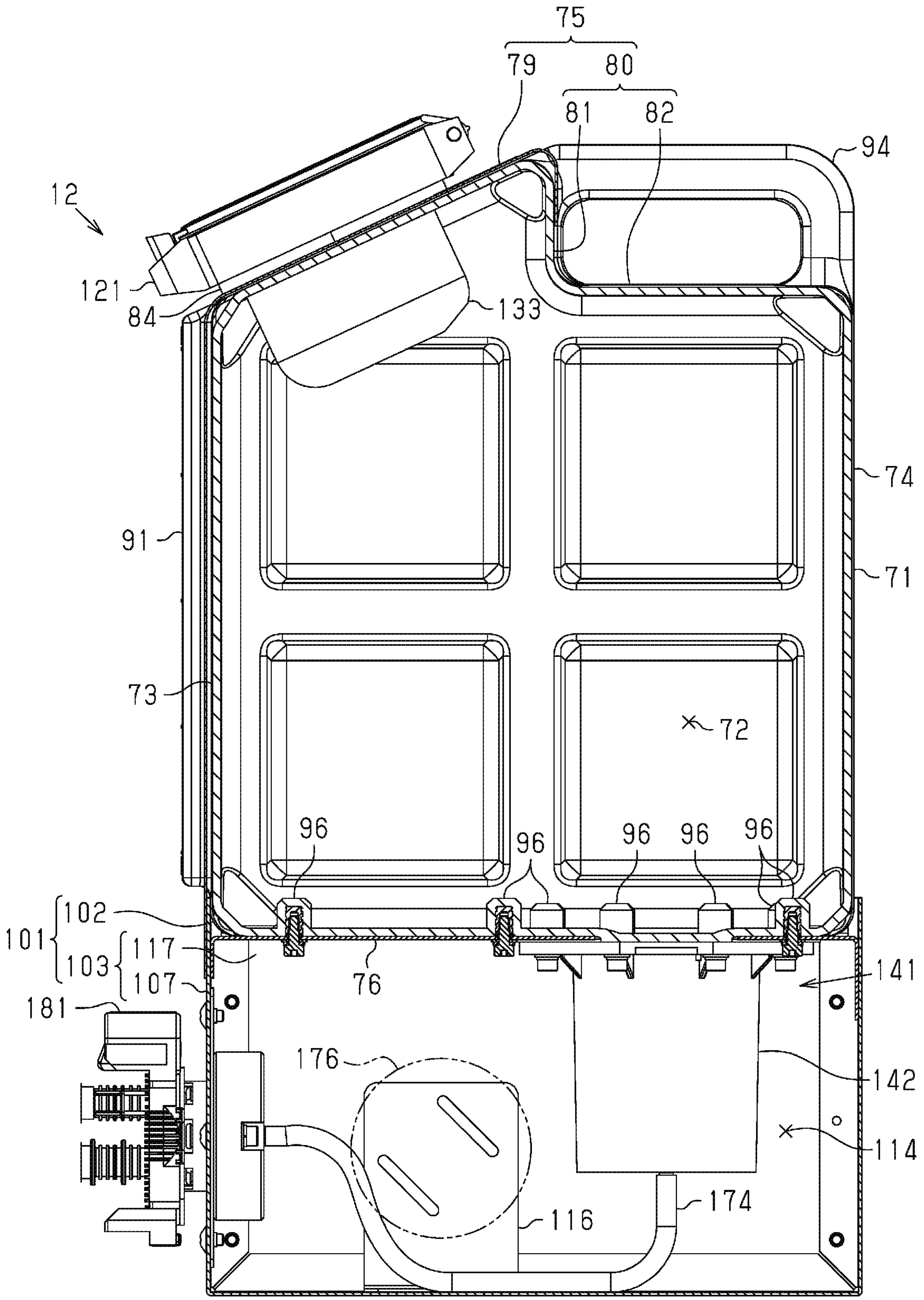
FIG. 11 is a cross-sectional view of the liquid accommodation body taken from a position different from that in FIG. 10.

As shown in FIG. 10 and FIG. 11, the container 71 has one or more attachment sections 96. The attachment section 96 is used to attach another member to the container 71. The attachment section 96 is located, for example, in the bottom surface 76. The attachment section 96 includes, for example, a metal fitting that receives a screw. This metal fitting is insert-molded into the container 71, for example. Another member is attached to the container 71 by inserting a screw into the attachment section 96, for example.

As shown in FIG. 10, the container 71 has a delivery port 98. The delivery port 98 is an opening through which liquid is led out from the container 71. Liquid is led out from the accommodation chamber 72 through the delivery port 98. The delivery port 98 is located at a lower portion of the container 71. The delivery port 98 opens, for example, in the bottom surface 76. The delivery port 98 is located at the rear portion of the bottom surface 76. In the bottom surface 76, the delivery port 98 opens in an area located directly below the second surface 82.

Figure 8:
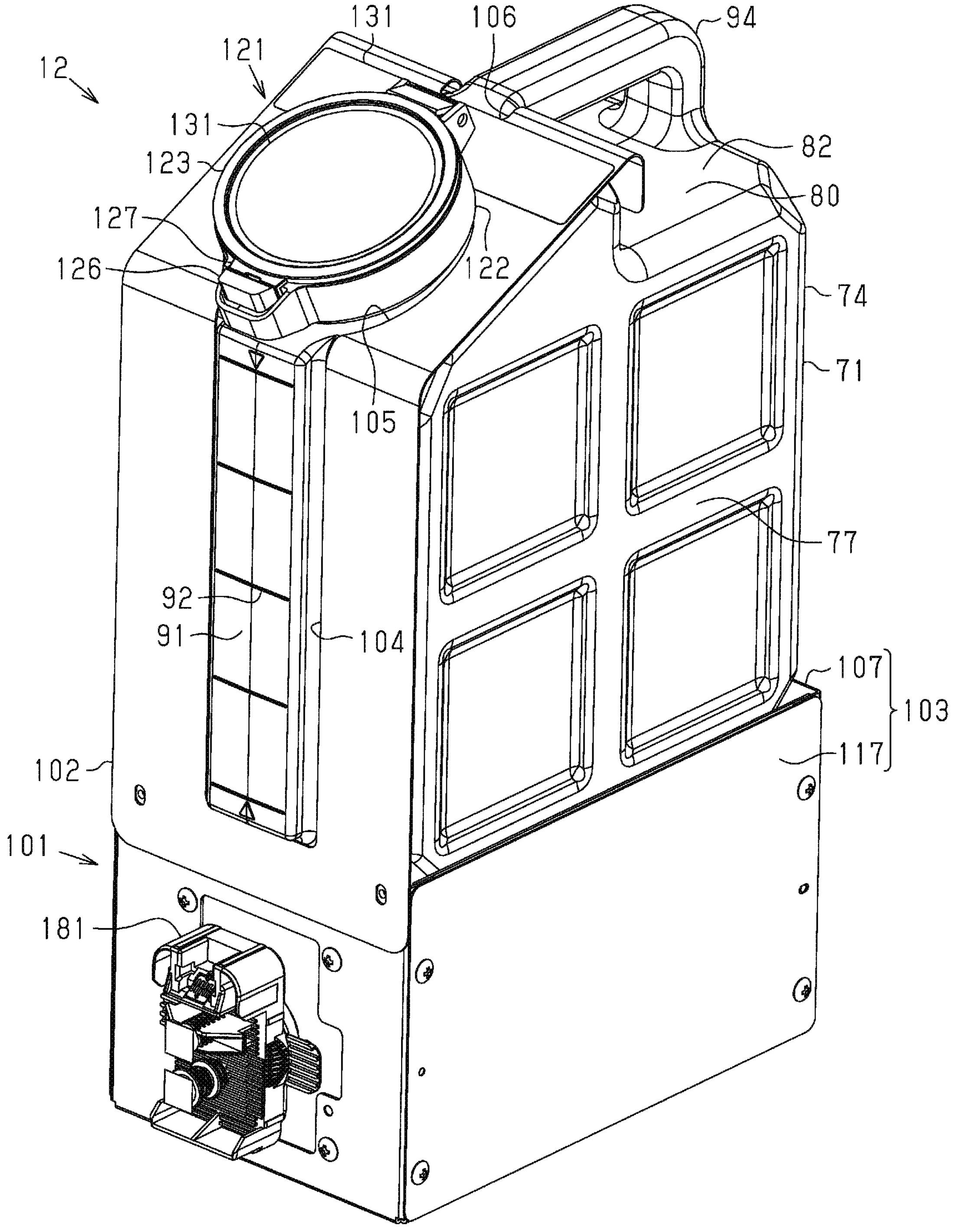
FIG. 8 is a perspective view of the liquid accommodation body.

As shown in FIG. 8 and FIG. 9, the liquid accommodation body 12 has a protection member 101. The protection member 101 is configured to enclose the container 71. The protection member 101 protects the container 71 by enclosing the container 71. The protection member 101 has, for example, a cover 102 and a base 103. The protection member 101 may be configured with only the cover 102.

The cover 102 is attached to the base 103. The cover 102 is, for example, screwed to the base 103. The cover 102 is detachable from the base 103. The cover 102 may be integral with the base 103.

The cover 102 is configured to cover a part of the container 71. The cover 102 is configured to cover at least a part of the front surface 73. The cover 102 is configured to cover the front surface 73 and the top surface 75 of the container 71, for example. Specifically, the cover 102 extends to cover the container 71 from the front surface 73 to the first surface 81. In other words, the cover 102 is configured to cover the inclined surface 79 and the first surface 81 of the top surface 75.

If there is no cover 102, when liquid is spilled during filling, the spilled liquid can easily flow down from the inclined surface 79 to the front surface 73. In this regard, since the cover 102 covers the front surface 73 and the inclined surface 79, the spilled liquid during filling flows down on the cover 102. Therefore, the user can easily wipe off the spilled liquid.

The surface area of the container 71 that is covered by the cover 102 is smaller than the surface area of the container 71 that is not covered by the cover 102. Portions of the container 71 that are not covered by the cover 102 are exposed. The portions of the container 71 that are not covered by the cover 102 are, for example, a rear surface 74, a right side surface 77, and a left side surface 78. The container 71 takes in outside light through the portions not covered by the cover 102. Thus, since the surface area of the container 71 that is covered by the cover 102 is smaller than the surface area of the container 71 that is not covered by the cover 102, the container 71 can take in outside light more easily. This makes it easier for the user to see the liquid level. The user may see the liquid level through areas not covered by cover 102, not limited to the visual check section 91.

The cover 102 covers a part of the container 71 so that the visual check section 91 is exposed. The cover 102 has a viewing opening 104. The viewing opening 104 exposes the visual check section 91. The viewing opening 104 opens in a portion of the cover 102 that covers the front surface 73. The visual check section 91 is inserted into the viewing opening 104. Therefore, the visual check section 91 protrudes forward from the cover 102.

The cover 102 covers a part of the container 71 so as to expose the inlet 85. The cover 102 has an inlet opening 105. The inlet opening 105 exposes the inlet section 84. The inlet opening 105 opens in a portion of the cover 102 that covers the inclined surface 79. The inlet section 84 is inserted into the inlet opening 105. The inlet opening 105 may be connected to the viewing opening 104.

The cover 102 has a gripping opening 106. The gripping opening 106 exposes the gripping section 94. The gripping opening 106 opens in a portion of the cover 102 that covers the first surface 81. The gripping section 94 is inserted into the gripping opening 106. The gripping opening 106 may be connected to the inlet opening 105.

The base 103 supports the container 71 from below. The base 103 is located below the container 71. By supporting the container 71 by the base 103, the posture of the liquid accommodation body 12 is stabilized. The base 103 is fixed to the container 71. The base 103 is fixed to the container 71 by the attachment section 96.

Figure 13:
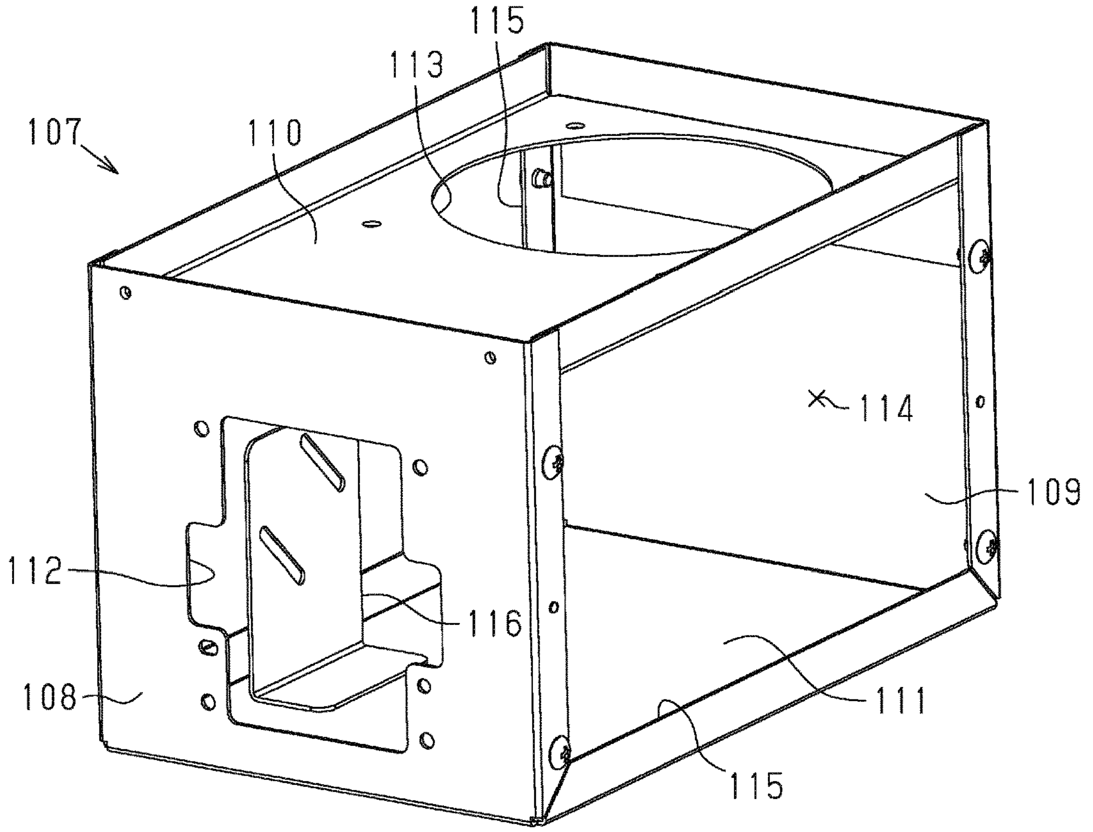
FIG. 13 is a perspective view showing a frame.

The base 103 has a frame 107. The frame 107 is made of sheet metal, for example. As shown in FIG. 13, the frame 107 includes, for example, an attachment plate 108, a protection plate 109, a top plate 110, and a bottom plate 111.

The attachment plate 108 is located forward in the frame 107. The attachment plate 108 is opposite to the protection plate 109. The attachment plate 108 connects to the top plate 110 and the bottom plate 111. The cover 102 is fixed to the attachment plate 108.

The attachment plate 108 has a mounting opening 112. The mounting opening 112 is an opening where a lead out section 181, to be described later, is attached. The protection plate 109 is located toward the rear of the frame 107. The protection plate 109 connects to the top plate 110 and the bottom plate 111.

The top plate 110 is located at an upper portion in the frame 107. The top plate 110 is opposite to the bottom plate 111. The top plate 110 connects to the attachment plate 108 and the protection plate 109. The container 71 is placed on the top plate 110. The top plate 110 is in contact with the container 71. The top plate 110 faces the bottom surface 76. The top plate 110 has an insertion port 113. The insertion port 113 overlaps the delivery port 98 while the container 71 is placed on the frame 107. The insertion port 113 has a larger opening area than the delivery port 98.

The bottom plate 111 is located at a lower portion of the frame 107. The bottom plate 111 connects to the attachment plate 108 and the protection plate 109. The frame 107 defines an accommodation space 114 below the container 71. The accommodation space 114 is a space defined by the attachment plate 108, the protection plate 109, the top plate 110, and the bottom plate 111. The accommodation space 114 is an externally accessible space. A configuration provided by the liquid accommodation body 12 is located in the accommodation space 114.

The frame 107 has one or more openings 115. For example, the frame 107 has two openings 115. The opening 115 is an opening defined by the attachment plate 108, the protection plate 109, the top plate 110, and the bottom plate 111. The accommodation space 114 connects to the openings 115. The user can access the accommodation space 114 through the openings 115.

The frame 107 may have a support plate 116. The support plate 116 is a plate that supports the configuration of the liquid accommodation body 12 which is located in the accommodation space 114. For example, a sub-filter section 176, to be described later, is attached to the support plate 116. The support plate 116 is attached to the bottom plate 111. The support plate 116 is attached to the bottom plate 111 by welding, for example.

As shown in FIG. 9, the base 103 may have one or more closing plates 117. The closing plate 117 is attached to the frame 107. The closing plate 117 is detachable from the frame 107. The closing plate 117 is attached to the frame 107 to close the opening 115. This protects the configuration of the liquid accommodation body 12 which is located in the accommodation space 114.

Figure 14:
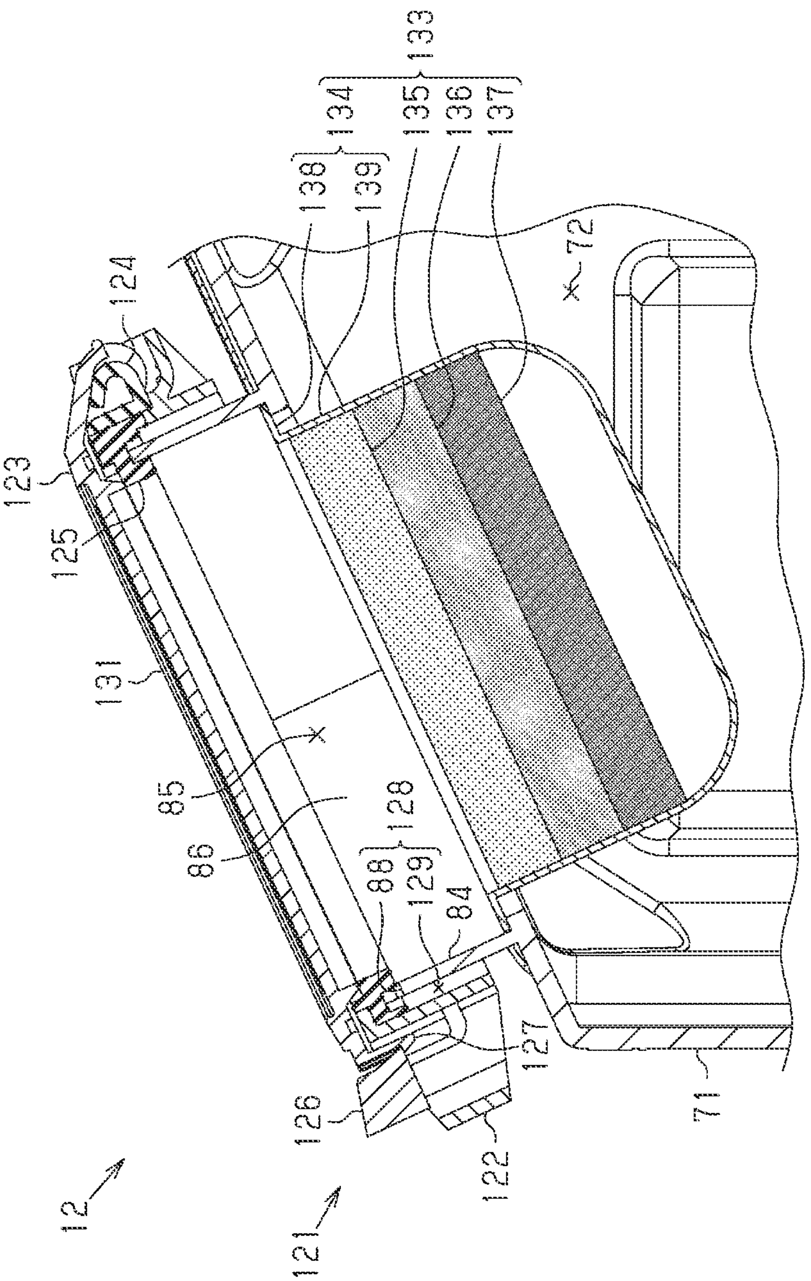
FIG. 14 is a cross-sectional view of a cap and a filter section when the cap is closed.
Figure 15:
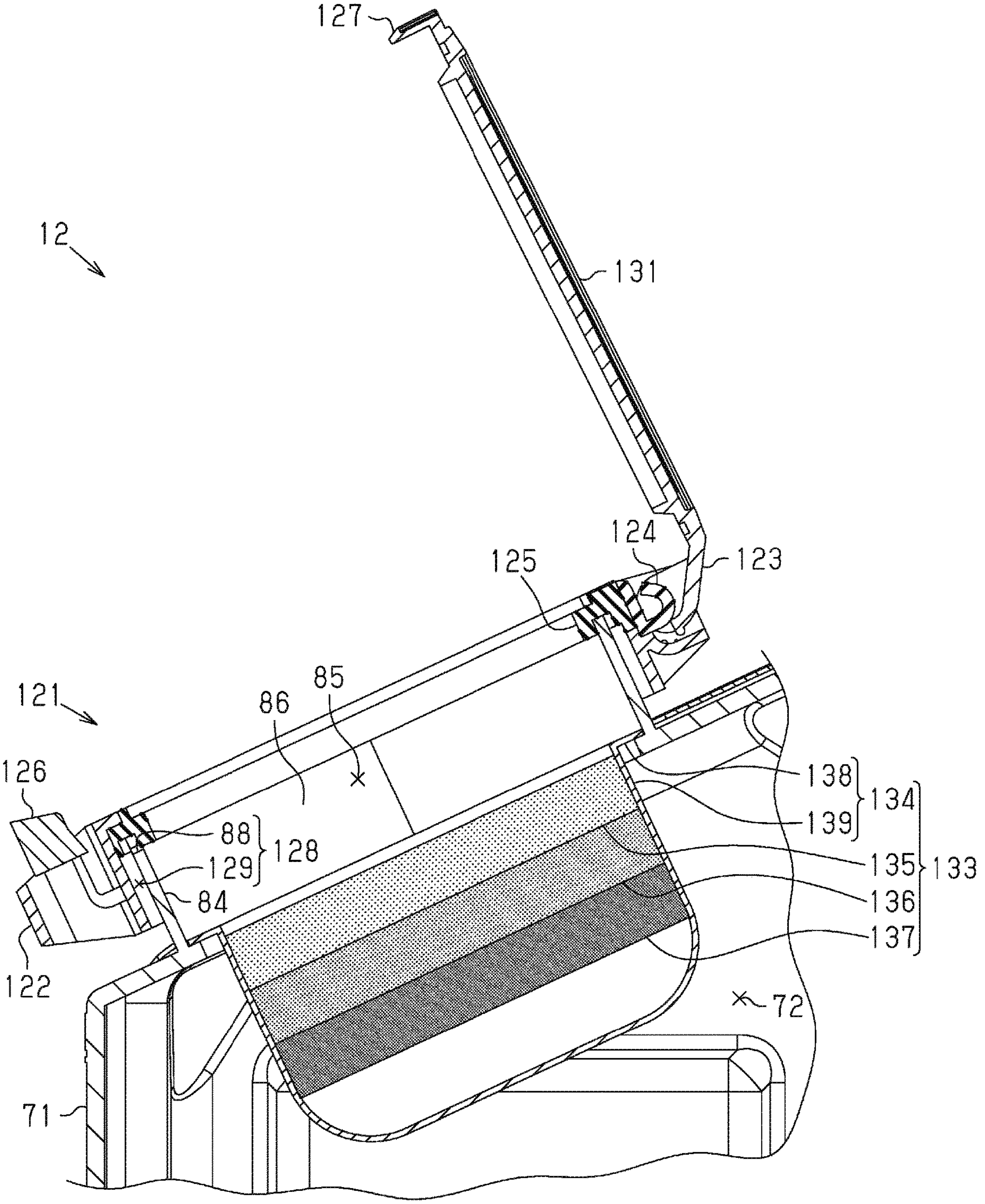
FIG. 15 is a cross-sectional view of the cap and the filter section when the cap is open.

As shown in FIG. 14 and FIG. 15, the liquid accommodation body 12 has the cap 121. The cap 121 seals the inlet 85. The cap 121 covers the inlet section 84, thereby sealing the inlet 85. The cap 121 is attached to the container 71. In particular, the cap 121 is attached to the inlet section 84.

The cap 121 opens and closes with respect to the container 71. The cap 121 seals the inlet 85 by closing. This reduces the possibility of foreign matter such as dust, dirt, and the like, entering through the inlet 85. The cap 121 releases the inlet 85 by opening. Thus, the user can fill the liquid through the inlet 85.

The cap 121 has an attachment member 122, a lid member 123, and a pressing member 124. The cap 121 has a gasket 125. The attachment member 122 is attached to the inlet section 84. The attachment member 122 is fixed to the inlet section 84 by engaging the screw thread 87. The attachment member 122 is fixed to the inlet section 84 so as to surround the peripheral wall 86. The attachment member 122 extends in a circular shape.

The attachment member 122 has a holding portion 126. The holding portion 126 holds the lid member 123 in a closed state by contacting the lid member 123. In other words, the holding portion 126 holds the lid member 123 so that the inlet 85 remains sealed by the cap 121. The holding portion 126 holds the lid member 123, for example, by contacting a tip of the lid member 123.

The lid member 123 is attached to the attachment member 122. The lid member 123 pivots with respect to the attachment member 122. The lid member 123 opens and closes with respect to the inlet section 84 by pivoting against the attachment member 122. The lid member 123 seals or releases the inlet 85 by pivoting against the attachment member 122.

A base end portion of the lid member 123 is attached to the attachment member 122. The lid member 123 is attached to the attachment member 122, for example, by a hinge. The lid member 123 pivots around the base end portion.

A tip end portion of the lid member 123 contacts the holding portion 126 in the closed state. The lid member 123 has a protruding part 127. The protruding part 127 is located at the tip end portion of the lid member 123. The protruding part 127 hooks onto the holding portion 126 when the lid member 123 is closed. The lid member 123 is thus held in a closed state by the holding portion 126. When the holding portion 126 is pushed by the user, the protruding part 127 disengages from the holding portion 126.

Since the lid member 123 is attached to the attachment member 122, the user does not need to prepare a place to put the lid member 123 when the lid member 123 is opened. Therefore, it is easier for the user to introduce the liquid. If the lid member 123 is detachable from the attachment member 122, the user must prepare a place to put the detached lid member 123 when opening the lid member 123.

The pressing member 124 is attached to the attachment member 122. The pressing member 124 is a member that presses the lid member 123 so that the lid member 123 opens. The pressing member 124 is, for example, an elastic sheet material. The pressing member 124 may be a spring. The pressing member 124 contacts the base end portion of the lid member 123. The pressing member 124 deforms as the lid member 123 closes. The pressing member 124 pushes the lid member 123 so that the lid member 123 opens by its elasticity. The lid member 123 is opened vigorously by the pressing member 124 as the protruding part 127 is disengaged from the holding portion 126. This reduces the effort for the user to open the lid member 123. In addition, by the pressing member 124 pressing the lid member 123, for example, there is no possibility that the lid member 123 unintentionally closes the inlet 85 by the weight of the lid member 123. In other words, the lid member 123 is kept open by the pressing member 124. Therefore, it is easier for the user to introduce the liquid.

The gasket 125 is attached to the attachment member 122. As the attachment member 122 is attached to the inlet section 84, the gasket 125 contacts the tip of the peripheral wall 86. The gasket 125 is pressed against the tip of the peripheral wall 86 when the lid member 123 is closed. Thereby, the gasket 125 is tightly attached to the lid member 123 and the inlet section 84. The tight fit of the gasket 125 to the lid member 123 and the inlet section 84 reduces a possibility of evaporation of the liquid contained in the container 71. The gasket 125 may be integrated with the pressing member 124.

The gasket 125 contacts the tip of the peripheral wall 86 so as not to cover the entire through passage 88. Therefore, when the lid member 123 is closed, the inlet 85 connects to atmosphere through the through passage 88. This enables liquid to be smoothly supplied from the liquid accommodation body 12 to the liquid ejection device 11 when the lid member 123 is closed.

When the cap 121 seals the inlet 85, the cap 121 and the inlet section 84 constitute an atmospheric release path 128. The atmospheric release path 128 is a flow path that connects the inside of container 71, that is, the accommodating chamber 72, to atmosphere, when the cap 121 seals the inlet 85. The atmospheric release path 128 includes, for example, the through passage 88.

The atmospheric release path 128 includes a gap 129 between the inlet section 84 and the cap 121. Specifically, the atmospheric release path 128 includes the gap 129 between the peripheral wall 86 and the attachment member 122. The gap 129 connects to the through passage 88. Therefore, the air that flows out from the container 71 via the through passage 88 passes through the gap 129.

The atmospheric release path 128 is configured by the cap 121 and the inlet section 84 and thus extends over the area covered by the cap 121. This makes it difficult for foreign matter to enter the atmospheric release path 128. The atmospheric release path 128 may be configured, for example, not only by forming the through passage 88 in the inlet section 84, but also by forming a through passage in the cap 121. For example, the atmospheric release path 128 may include a through passage formed in the attachment member 122, the lid member 123, the gasket 125, and the like. The through passage should be formed so that when the lid member 123 is closed, the inlet 85 is not sealed by the gasket 125. By this, the atmospheric release path 128 is configured so that foreign matter does not easily enter.

As shown in FIG. 8, the liquid accommodation body 12 has an indication section 131. The indication section 131 indicates a type of liquid to be introduced from the inlet 85. In other words, the indication section 131 indicates the type of the liquid contained in the container 71. The indication section 131 is, for example, a label. By seeing the indication section 131, the user can introduce in the same type of liquid that is contained in the container 71.

The indication section 131 is located on the cap 121. Specifically, the indication section 131 is located on the surface of the lid member 123. The indication section 131 may be located on the cover 102. The indication section 131 may be located, for example, in a portion of the cover 102 that covers the inclined surface 79.

As shown in FIG. 14, the liquid accommodation body 12 has a filter section 133. The filter section 133 is attached to the container 71. The filter section 133 can be attached to and detached from the container 71. The filter section 133 is attached to the inlet section 84.

The filter section 133 is configured to collect foreign matter. The filter section 133 reduces a possibility of foreign matter entering the container 71 through the inlet 85. The filter section 133 includes, for example, a holding member 134 and one or more filters. The filter section 133 has, for example, a holding member 134, a first filter 135, a second filter 136, and a third filter 137.

When liquid is introduced through the inlet 85, the liquid passes through the filter section 133. The liquid introduced through the inlet 85 passes through the first filter 135, the second filter 136, and the third filter 137, in this order. The first filter 135 is a primary filter. The second filter 136 is a secondary filter through which the liquid that has passed through the primary filter passes. The third filter 137 is a tertiary filter through which the liquid that has passed through the secondary filter passes. Foreign matter is removed from liquid as the liquid passes through one or more filters.

The holding member 134 holds the first filter 135, the second filter 136, and the third filter 137. The holding member 134 is fitted into the inlet 85. The holding member 134 is configured to enable liquid to pass through it. The holding member 134 is a mesh filter made of stainless steel. Therefore, the holding member 134 also functions as a quaternary filter. Liquid that has passed through the first filter 135, the second filter 136, and the third filter 137 passes through the holding member 134, which is the quaternary filter.

The holding member 134 has an edge portion 138 and a protruding portion 139. The edge portion 138 is in contact with a base end portion of the inlet section 84. The holding member 134 is attached to the container 71 by hooking the edge portion 138 onto a base end portion of the inlet section 84. The protruding portion 139 connects to the edge portion 138. The protruding portion 139 is a portion that protrudes from the edge portion 138 into the container 71. Therefore, the protruding portion 139 is positioned in the accommodation chamber 72.

One or more filters are placed within the protruding portion 139. That is, the protruding portion 139 holds the first filter 135, the second filter 136, and the third filter 137. The first filter 135, the second filter 136, and the third filter 137 are located above a bottom of the protruding portion 139. Therefore, liquid that has passed through the first filter 135, the second filter 136, and the third filter 137 passes through the bottom of the protruding portion 139.

The first filter 135 is, for example, a sponge filter. The first filter 135 is a filter that comes in contact first with the liquid introduced through the inlet 85 in the filter section 133. The first filter 135 is located above the second filter 136.

The second filter 136 is, for example, a sponge filter. The second filter 136 is a filter that contacts the liquid that has passed through the first filter 135 in the filter section 133. The second filter 136 is located below the first filter 135. The second filter 136 is stacked with the first filter 135.

The third filter 137 is, for example, a sponge filter. The third filter 137 is a filter that contacts the liquid that has passed through the second filter 136 in the filter section 133. The third filter 137 is located below the second filter 136.

The mesh coarseness of the first filter 135 is coarser than the mesh coarseness of the second filter 136. The mesh coarseness of the second filter 136 is coarser than the mesh coarseness of the third filter 137. Specifically, a filtered particle size of the first filter 135 is larger than the filtered particle size of the second filter 136. The filtered particle size of the second filter 136 is larger than the filtered particle size of the third filter 137.

The filtered particle size means, for example, when standard particles of a known diameter are filtered, the particle size at which the collection rate of standard particles is 99% or higher. The smaller the filtered particle size of the filter, the finer the foreign matter being collected. On the other hand, the smaller the filtered particle size of the filter, the greater the pressure loss as the liquid passes through the filter. That is, the smaller the filtered particle size of the filter, the harder it is for the liquid to pass through the filter. In filters, the filtered particle size and pressure loss have a trade-off relationship.

If the liquid has difficulty passing through the filter, pouring of the liquid will be delayed. If the liquid has difficulty passing through the filter, the liquid may accumulate in the filter. In this case, there is a possibility that the introduced liquid will bounce on the filter. If the liquid bounces on the filter, the liquid may be splashed around the inlet section 84.

When liquid is introduced through the inlet section 84, the liquid first comes into contact with the first filter 135. Since the first filter 135 has a coarse mesh, the liquid can easily pass through the first filter 135. Therefore, the liquid does not accumulate in the first filter 135. This reduces a possibility that the introduced liquid will be splashed.

The liquid that has passed through the first filter 135 comes into contact with the second filter 136. Since the second filter 136 has a fine mesh coarseness, fine foreign matter is collected by the second filter 136. That is, the second filter 136 collects the foreign matter that has passed through the first filter 135.

Since the second filter 136 has a fine mesh coarseness, the introduced liquid may accumulate in the second filter 136. The velocity of the introduced liquid is attenuated by passing through the first filter 135. Therefore, even if the liquid accumulates in the second filter 136, the possibility of the liquid bouncing on the second filter 136 is small. Further, even if the liquid bounces on the second filter 136, the bounced liquid is caught by the first filter 135. Therefore, the possibility of liquid splashing around the inlet section 84 is small.

The liquid that has passed through the second filter 136 comes into contact with the third filter 137. Since the third filter 137 has a fine mesh coarseness, fine foreign matter is collected by the third filter 137. That is, the third filter 137 collects the foreign matter that has passed through the second filter 136.

Since the third filter 137 has a fine mesh coarseness, the introduced liquid may accumulate in the third filter 137. The velocity of the introduced liquid is attenuated by passing through the second filter 136. Therefore, even if the liquid accumulates in the third filter 137, a possibility of the liquid bouncing on the third filter 137 is small. Further, even if the liquid bounces on the third filter 137, the bounced liquid is caught by the second filter 136. Therefore, the possibility of liquid splashing around the inlet section 84 is small.

A mesh coarseness of the holding member 134, which functions as the quaternary filter, may be coarser than the mesh coarseness of the first filter 135 or finer than the mesh coarseness of the third filter 137. The mesh coarseness of the holding member 134 may be finer than the mesh coarseness of the first filter 135 and also coarser than the mesh coarseness of the second filter 136. Further alternatively, the mesh coarseness of the holding member 134 may be finer than the mesh coarseness of the second filter 136 and coarser than the mesh coarseness of the third filter 137. If the mesh coarseness of the holding member 134 is finer than the mesh coarseness of the third filter 137, then the filter section 133 can collect finer foreign matter.

As shown in FIG. 10, the liquid accommodation body 12 has a lead out mechanism 141. The lead out mechanism 141 is a mechanism that leads liquid from the container 71 to the coupler 14. The lead out mechanism 141 is connected to the container 71 and the coupler 14.

The lead out mechanism 141 has a valve section 142. The valve section 142 is configured to be openable and closable. The valve section 142 controls the flow of liquid by opening and closing. When the valve section 142 is opened, liquid can be led out from the container 71 to the coupler 14. When the valve section 142 is closed, liquid cannot be led out from the container 71 to the coupler 14.

The valve section 142 is attached to the container 71. Specifically, the valve section 142 is attached to the bottom surface 76. The valve section 142 is mounted so that it overlaps the delivery port 98. The valve section 142 is not limited to being directly connected to the container 71, and may be connected to the container 71 via a tube, for example. The valve section 142 is screwed to the container 71 using the attachment sections 96. The valve section 142 is housed in the frame 107. The valve section 142 is inserted into the insertion port 113. Thus, the valve section 142 is located in the accommodation space 114.

The valve section 142 is configured to open and close in accordance with an amount of liquid contained in the container 71. For example, the valve section 142 closes when the amount of liquid remaining in the container 71 is zero or minimal. This reduces a possibility of air flowing from the liquid accommodation body 12 to the liquid ejection device 11. The valve section 142 is, for example, a float valve that automatically opens and closes in accordance with the amount of liquid contained in the container 71.

Figure 16:
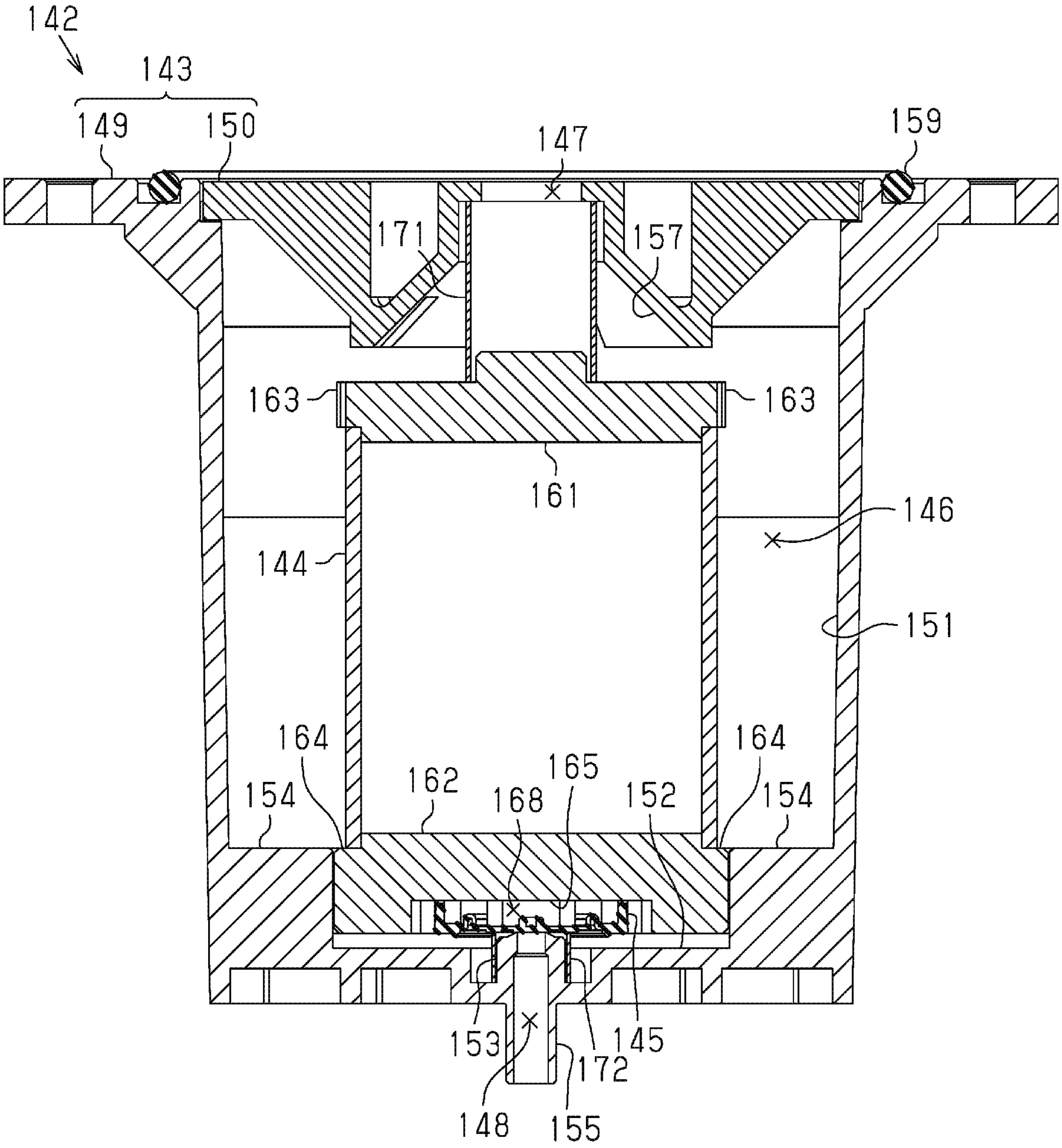
FIG. 16 is a cross-sectional view of a valve section.
Figure 17:
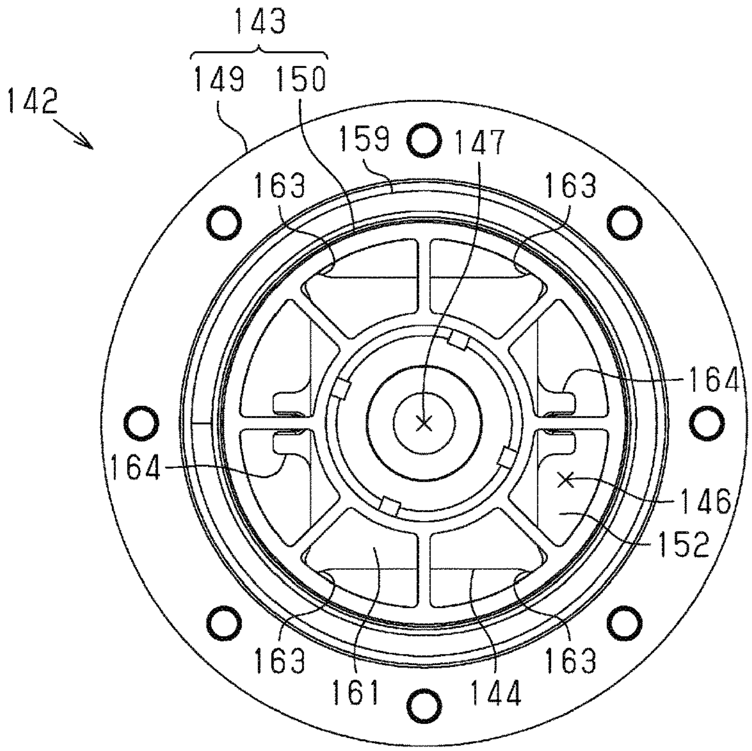
FIG. 17 is a plan view of the valve section.

As shown in FIG. 16 and FIG. 17, the valve section 142 has a holder 143, a float 144, and a sealing member 145. The holder 143 houses the float 144 and the sealing member 145. The holder 143 is a cylindrical shape. The inside of the holder 143 connects to the delivery port 98. Liquid flows from the container 71 to the coupler 14 by passing through the holder 143.

The holder 143 has a liquid chamber 146, an inflow path 147, and an outflow path 148. The liquid chamber 146 is a space in which the float 144 and the sealing member 145 are housed. The liquid chamber 146 connects to the inflow path 147 and the outflow path 148. Liquid flows into the liquid chamber 146 through the inflow path 147. Liquid flows out from the liquid chamber 146 through the outflow path 148.

The holder 143 has a body 149 and a stopper 150. The liquid chamber 146 is defined by the assembly of the stopper 150 on the body 149. The outflow path 148 is opened in the body 149. The inflow path 147 is opened in the stopper 150.

The body 149 is a member that houses the float 144 and the sealing member 145. The body 149 has an inner peripheral surface 151 and a bottom surface 152. The inner peripheral surface 151 and the bottom surface 152 are surfaces located inside the holder 143. The inner peripheral surface 151 is a surface that defines the liquid chamber 146. The inner peripheral surface 151 extends in a circular shape, as the holder 143 is viewed from above. The bottom surface 152 is a surface in which the outflow path 148 is opened. The bottom surface 152 is connected to the inner peripheral surface 151.

The body 149 has a contact pipe 153. The contact pipe 153 extends from the bottom surface 152. The contact pipe 153 protrudes from the bottom surface 152 toward the stopper 150. The contact pipe 153 extends upward, for example. The tip of the contact pipe 153 contacts the sealing member 145. The outflow path 148 opens in the contact pipe 153.

The body 149 has a guide portion 154. The guide portion 154 guides the movement of the float 144. The guide portion 154 protrudes from the inner peripheral surface 151 and the bottom surface 152. The guide portion 154 is, for example, a rib.

The body 149 has a joint 155. The outflow path 148 is opened in the joint 155. The joint 155 extends in the opposite direction from the contact pipe 153 in the body 149. The joint 155 extends downward, for example. The joint 155 is located, for example, at a lower portion of the body 149. The holder 143 is connected to another member by the joint 155. The joint 155 enables liquid to flow from the outflow path 148 to another member.

The stopper 150 is a member that holds the float 144 in the liquid chamber 146. The stopper 150 restricts the float 144 from popping out of the body 149 by contacting the float 144. The stopper 150 is located opposite to the joint 155 with respect to the body 149. The stopper 150 is located, for example, at an upper portion of the body 149. The stopper 150 is sandwiched between the container 71 and the body 149. In this way, the stopper 150 is assembled to the body 149.

The stopper 150 has an inflow surface 157. The inflow surface 157 is a surface located inside the holder 143. The inflow surface 157 is a surface that defines the inflow path 147. The inflow surface 157 is inclined so that the cross-sectional area of the inflow path 147 increases from the delivery port 98 toward the liquid chamber 146. By having the inflow surface 157 inclined, air bubbles in the liquid chamber 146 can easily flow into the container 71 through the inflow path 147.

The holder 143 has a packing 159. The packing 159 is attached to the body 149. The packing 159 is located, for example, at an upper portion of the body 149. The packing 159 is sandwiched between the body 149 and the container 71. The packing 159 thereby seals the container 71 and the body 149. As a result, a possibility of the liquid leaking from between the container 71 and the valve section 142 is reduced.

The packing 159 extends circularly, surrounding the stopper 150, at the upper portion of the body 149. This configuration can reduce the number of parts compared to the configuration in which the stopper 150 is located at a lower portion of the body 149. In the configuration where the stopper 150 is located at the lower portion of the body 149, a separate member would be needed to seal the body 149 and the stopper 150. In this regard, in the configuration where the stopper 150 is located at the upper portion of the body 149 and the packing 159 surrounds the stopper 150, there is no need to seal the stopper 150 and the body 149.

The float 144 is located in the liquid chamber 146. The mass of the float 144 is less than the mass of the liquid contained in the container 71. Therefore, the float 144 floats with respect to the liquid. The float 144 moves up and down according to the amount of liquid in the liquid chamber 146. For example, if the container 71 contains liquid, the liquid chamber 146 is filled with the liquid. In this case, the float 144 contacts the stopper 150. As the amount of liquid contained in the container 71 decreases, the liquid level drops to the liquid chamber 146. Specifically, when the amount of liquid contained in the container 71 reaches zero, the liquid level drops to the liquid chamber 146. Then, the float 144 approaches the bottom surface 152. As described above, the float 144 moves in accordance with the amount of liquid contained in the container 71. As the float 144 moves, the valve section 142 opens and closes.

When the liquid level drops to the liquid chamber 146, air enters into the liquid chamber 146. If air remains in the liquid chamber 146 even though liquid has been introduced into the container 71 and the liquid level has risen to the accommodation chamber 72, there is a possibility that the float 144 will not move properly. In this regard, the inflow surface 157 enables the air remaining in the liquid chamber 146 to easily return to the accommodation chamber 72.

Figure 18:
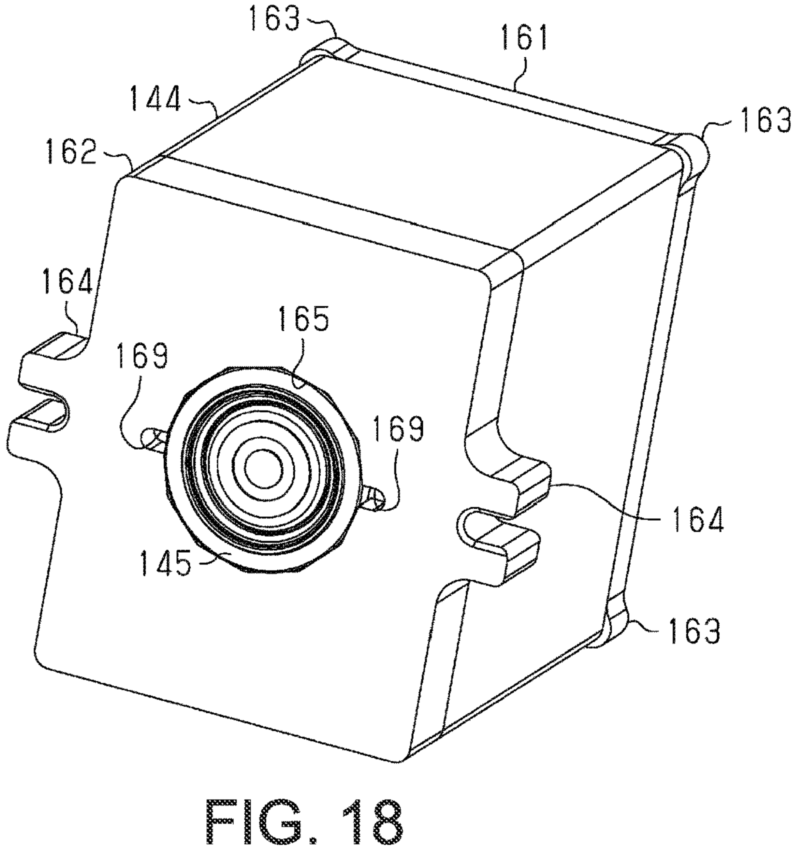
FIG. 18 is a perspective view of a float.
Figure 19:
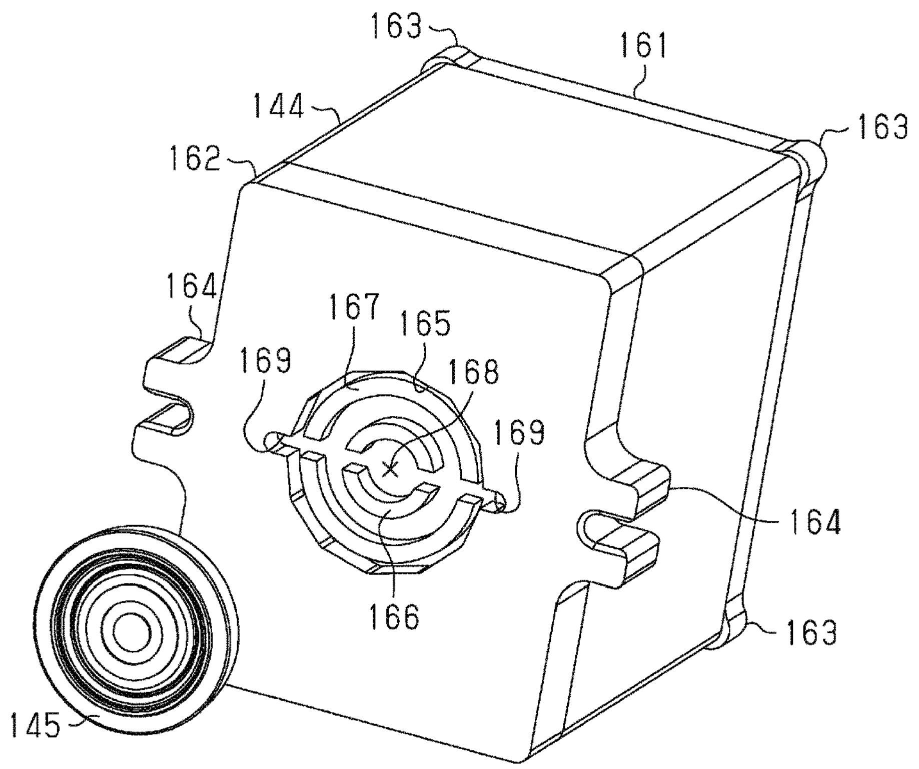
FIG. 19 is a perspective view of the float with a sealing member disassembled from FIG. 18.

As shown in FIG. 18 and FIG. 19, the float 144 has a rectangular parallelepiped shape. Therefore, when the float 144 is viewed from above, the shape of the float 144 is rectangular. The float 144 has a first facing portion 161 and a second facing portion 162. The first facing portion 161 is a portion facing the stopper 150. The first facing portion 161 is, for example, a portion located at an upper portion of the float 144. The second facing portion 162 is a portion facing the bottom surface 152. The second facing portion 162 is, for example, a portion located at a lower portion of the float 144. The first facing portion 161 and the second facing portion 162 are rectangular plate shapes.

The first facing portion 161 contacts the stopper 150 when the liquid chamber 146 is filled with liquid. Due to the inflow surface 157, an opening of the inflow path 147 that connects to the liquid chamber 146 is larger than an opening that connects to the delivery port 98. Therefore, the contact area between the float 144 and the stopper 150 is reduced compared to the case where the opening of the inflow path 147 that connects to the liquid chamber 146 is the same size or smaller than the opening that connects to the delivery port 98. This reduces a possibility of the float 144 sticking to the stopper 150 due to liquid adhering between the first facing portion 161 and the stopper 150. The first facing portion 161 has bulge portions 163.

The bulge portions 163 are located at the corners of the first facing portion 161. The bulge portions 163 are located, for example, at each of the four corners of the first facing portion 161. The bulge portions 163 bulge outwardly at the corners of the first facing portion 161. The bulge portions 163 contact the inner peripheral surface 151. The float 144 is guided in its movement by the inner peripheral surface 151 as the bulge portions 163 contact the inner peripheral surface 151.

The contact area between the float 144 and the inner peripheral surface 151 is reduced by the contact of the bulge portions 163 with the inner peripheral surface 151, compared to the case where the entire float 144 contacts the inner peripheral surface 151. This reduces a possibility of the float 144 sticking to the holder 143 due to liquid adhering between the float 144 and the inner peripheral surface 151.

Figure 20:
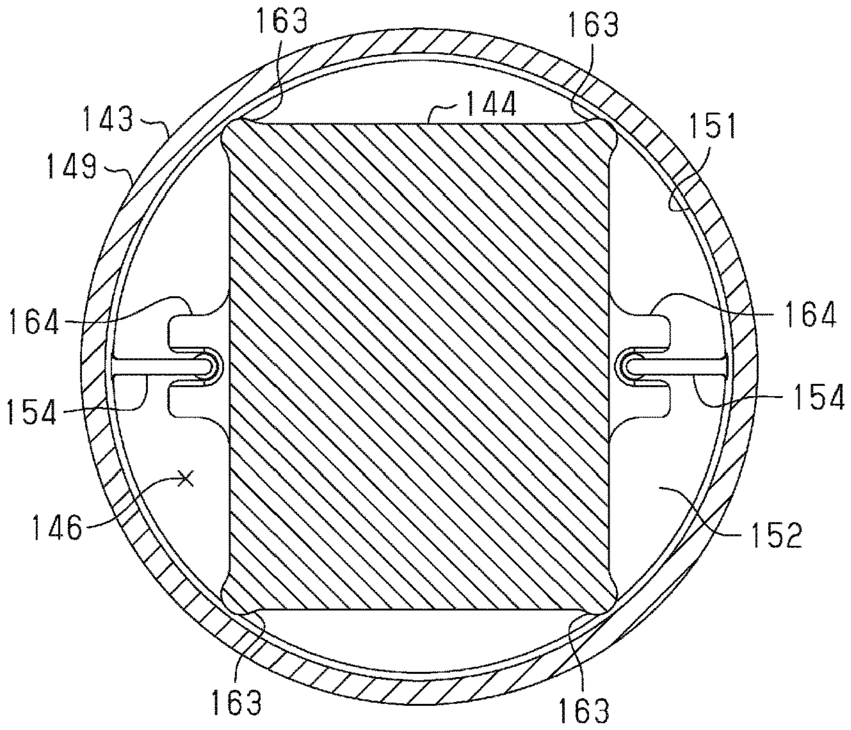
FIG. 20 is a cross-sectional view of the valve section cut in a direction different from that of FIG. 16.

As shown in FIG. 18, FIG. 19, and FIG. 20, the second facing portion 162 has insertion sections 164. The insertion sections 164 are configured so that the guide portions 154 are inserted. Each of the insertion sections 164 consist of two ribs extending toward the inner peripheral surface 151, for example. By inserting the guide portions 154 into the insertion sections 164, the float 144 is guided in its movement by the guide portions 154.

The float 144 is guided in its movement by the contact of the bulge portions 163 with the inner peripheral surface 151 and the insertion of the guide portions 154 into the insertion sections 164. That is, the float 144 is guided by the first facing portion 161 and the second facing portion 162. A possibility of the float 144 tilting is reduced by being guided at the upper portion of the float 144 and the lower portion of the float 144.

As shown in FIG. 18 and FIG. 19, the second facing portion 162 has an attachment recess 165. The attachment recess 165 is located on a surface of the second facing portion 162 that faces the bottom surface 152. The sealing member 145 is fitted into the attachment recess 165. Thus, the sealing member 145 is attached to the float 144 into the attachment recess 165. When the attachment recess 165 is viewed from the front, the attachment recess 165 is a polygonal-shaped recess.

The attachment recess 165 has a first rib 166 and a second rib 167. The first rib 166 and the second rib 167 extend in an arc shape when the attachment recess 165 is viewed from the front, for example. The sealing member 145 is attached to the attachment recess 165 by fitting the sealing member 145 into the first rib 166 and the second rib 167.

Figure 21:
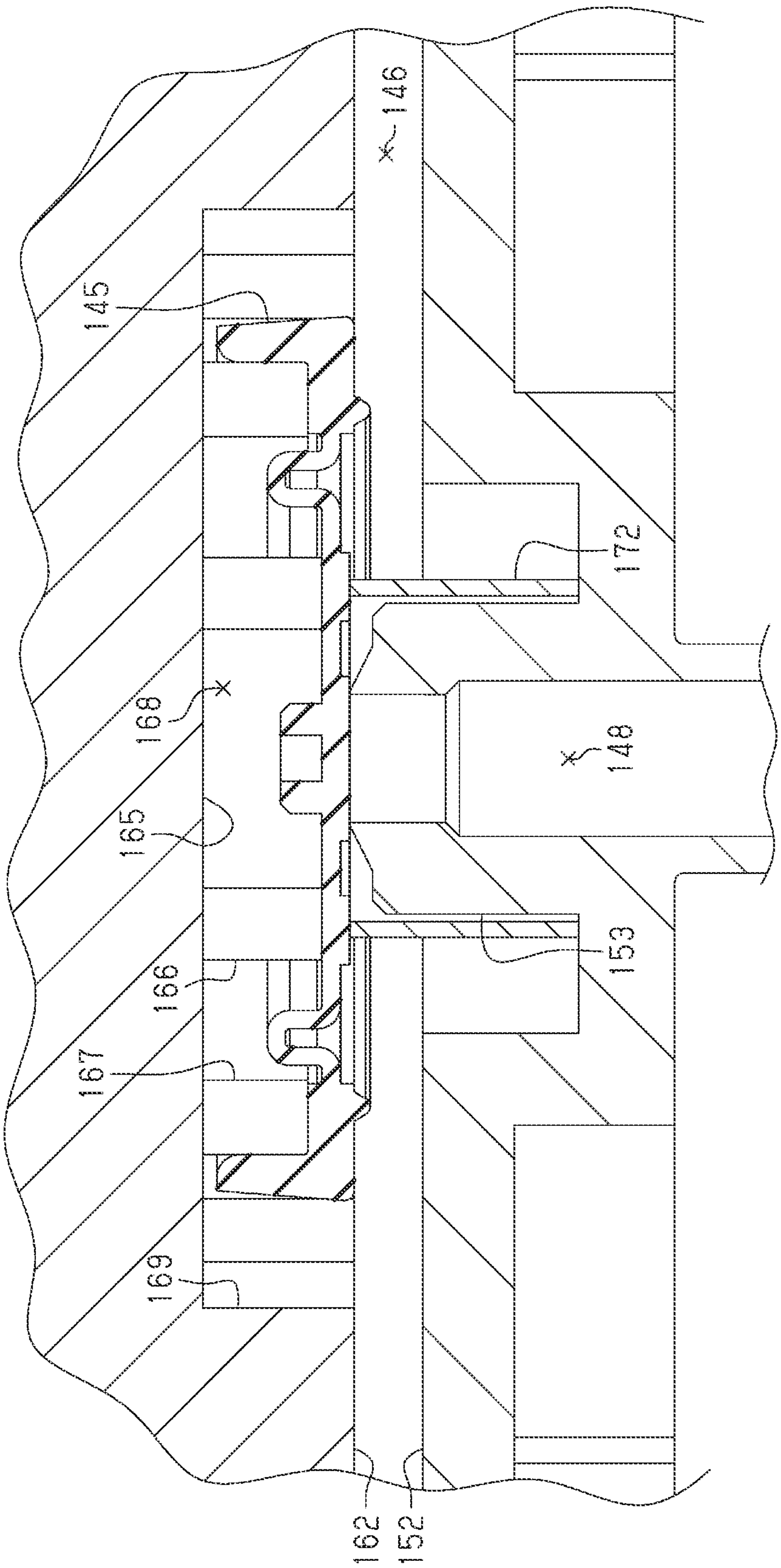
FIG. 21 is a cross-sectional view of the sealing member.

As shown in FIG. 21, the attachment recess 165 has a displacement space 168. The displacement space 168 is a space defined by the first rib 166 and the sealing member 145. The displacement space 168 is a space for displacement of the sealing member 145 when the contact pipe 153 contacts the sealing member 145. By the sealing member 145 making contact with the contact pipe 153, the holder 143 and the float 144 are sealed. This seals the outflow path 148.

When the liquid level in the liquid chamber 146 drops and the float 144 approaches the bottom surface 152, the contact pipe 153 makes contact with the sealing member 145 so that the contact pipe 153 pushes the sealing member 165 into the attachment recess 165, using the displacement space 168. The sealing member 145 is deformed when the contact pipe 153 contacts it. At this time, the sealing member 145 bends to reduce the volume of the displacement space 168.

Posture of the float 144 may be tilted in the liquid chamber 146. For example, the second facing portion 162 may not be parallel to the bottom surface 152. If the posture of the float 144 is tilted, the posture of the sealing member 145 is also tilted. In this case, there is a possibility that the contact pipe 153 may not make proper contact with the sealing member 145.

When the posture of the sealing member 145 is tilted, the sealing member 145 makes contact with the contact pipe 153 so that the contact pipe 153 wedges into the attachment recess 165, and the sealing member 145 deforms to fit the contact pipe 153. As a result, the contact pipe 153 can make proper contact with the sealing member 145. In other words, the sealing member 145 can seal the holder 143 and the float 144. Thus, the displacement space 168 enables the float 144 to accommodate the postural tilt of the float 144.

If there is no displacement space 168, the sealing member 145 cannot deform, when the float 144 is in a tilted posture and the sealing member 145 contacts the contact pipe 153. As a result, the posture of the sealing member 145 remains tilted. In this case, there is a possibility that the sealing member 145 cannot seal the holder 143 and the float 144.

As shown in FIG. 18 and FIG. 19, the attachment recess 165 has an evacuation groove 169. The evacuation groove 169 extends to notch the first rib 166 and the second rib 167. The evacuation groove 169 is a groove that connects the space between the sealing member 145 and the attachment recess 165 to the outside. The space between the sealing member 145 and the attachment recess 165 includes the displacement space 168.

When the sealing member 145 is attached to the attachment recess 165, air is discharged from a space between the sealing member 145 and the attachment recess 165 to the outside through the evacuation groove 169. In other words, the evacuation groove 169 makes it easier to attach the sealing member 145 to the attachment recess 165. If there is no evacuation groove 169, the space between the sealing member 145 and the attachment recess 165 is sealed when the sealing member 145 is attached to the attachment recess 165. In this case, air accumulates in the space between the sealing member 145 and the attachment recess 165, and this makes it difficult to attach the sealing member 145 to the attachment recess 165.

The shape of the sealing member 145 is a disk shape. When the attachment recess 165 is viewed from the front, although the attachment recess 165 is a polygonal shape, the sealing member 145 is a circular shape. Therefore, when attaching the sealing member 145 to the attachment recess 165, the outer peripheral surface of the sealing member 145 and the inner peripheral surface of the attachment recess 165 make contact at points. This reduces the frictional force between the sealing member 145 and the attachment recess 165. Therefore, it is easier to attach the sealing member 145 to the attachment recess 165. If the attachment recess 165 is a circular recess, the outer peripheral surface of the sealing member 145 and the inner peripheral surface of the attachment recess 165 contact each other on a surface. In this case, the frictional force between the sealing member 145 and the attachment recess 165 is high, and the sealing member 145 is difficult to attach to the attachment recess 165.

Instead of the attachment recess 165 is the polygonal shape, the attachment recess 165 may have a plurality of protrusions on its inner peripheral surface. In this case, the outer peripheral surface of the sealing member 145 and the inner peripheral surface of the attachment recess 165 also contact each other at points.

As shown in FIG. 16, the valve section 142 may have a spring. The valve section 142 has, for example, a first spring 171 and a second spring 172. The first spring 171 and the second spring 172 press the float 144 against the holder 143. This enables the float 144 to move easily. Further, the first spring 171 and the second spring 172 reduce a possibility of the float 144 sticking to the holder 143.

The first spring 171 presses the float 144 against the bottom surface 152. The first spring 171 is located between the holder 143 and the float 144. Specifically, the first spring 171 is located between the stopper 150 and the first facing portion 161. The first spring 171 contacts the stopper 150 and the first facing portion 161.

The second spring 172 presses the float 144 against the stopper 150. The second spring 172 is located between the holder 143 and the float 144. Specifically, the second spring 172 is located between the bottom surface 152 and the second facing portion 162. The second spring 172 contacts the bottom surface 152 and the sealing member 145.

As shown in FIG. 10, the lead out mechanism 141 has a lead out tube 174. The lead out tube 174 is a flow path through which liquid flows from the valve section 142. The lead out tube 174 includes, for example, a tube. The lead out tube 174 is connected to the valve section 142. Specifically, the lead out tube 174 is connected to the joint 155.

The lead out mechanism 141 may have a sub-filter section 176. The sub-filter section 176 may be located in the middle of the lead out tube 174, for example. The sub-filter section 176 is located downstream of the valve section 142 in the lead out mechanism 141.

The sub-filter section 176 is located in the accommodation space 114. The sub-filter section 176 is attached to the support plate 116, for example. The sub-filter section 176 is configured to collect foreign matter. The sub-filter section 176 includes, for example, a nonwoven fabric filter. As liquid passes through the sub-filter section 176, foreign matter is removed from the liquid.

The sub-filter section 176 is configured to collect finer foreign matter than the filter section 133. That is, a collection capacity of the sub-filter section 176 is higher than the collection capacity of the filter section 133. The collection capacity of the sub-filter section 176 depends on, for example, the nonwoven fabric filter. The collection capacity of the filter section 133 depends on the finest mesh filter in the filter section 133. Therefore, the mesh coarseness of the nonwoven fabric filter included in the sub-filter section 176 is finer than the mesh coarseness of the third filter 137. In other words, the filtered particle size of the non-woven filter included in the sub-filter section 176 is smaller than the filtered particle size of the third filter 137.

In leading liquid from the liquid accommodation body 12 to the liquid ejection device 11, the collection capacities required by the filter section 133 and the sub-filter section 176 are different. In the filter section 133, a passing speed of liquid is required in order to fill liquid smoothly into the container 71. Therefore, the filter section 133 only needs to collect enough foreign matter to enable the valve section 142 to operate properly. The sub-filter section 176 is required to collect foreign matter so that the ejection section 21 can operate properly.

In general, the ejection section 21 is more precise than the valve section 142. Therefore, liquid flowing through the ejection section 21 needs to be filtered more finely than liquid flowing through the valve section 142. The filter section 133 filters liquid for normal operation of the valve section 142. The sub-filter section 176 filters liquid for normal operation of the ejection section 21. By collecting foreign matter in two steps with the filter section 133 and the sub-filter section 176, it is easier to fill liquid while properly collecting foreign matter.

The lead out mechanism 141 has the lead out section 181. The lead out section 181 is connected to the lead out tube 174. The lead out section 181 is connected to the coupler 14. By connecting the lead out section 181 to the coupler 14, the liquid accommodation body 12 is connected to the liquid ejection device 11. In this way, the lead out section 181 leads liquid to the liquid ejection device 11.

The lead out section 181 is located across the inside and outside of the accommodation space 114. The lead out section 181 is attached to the frame 107. Specifically, the lead out section 181 is attached to the attachment plate 108.

Figure 22:
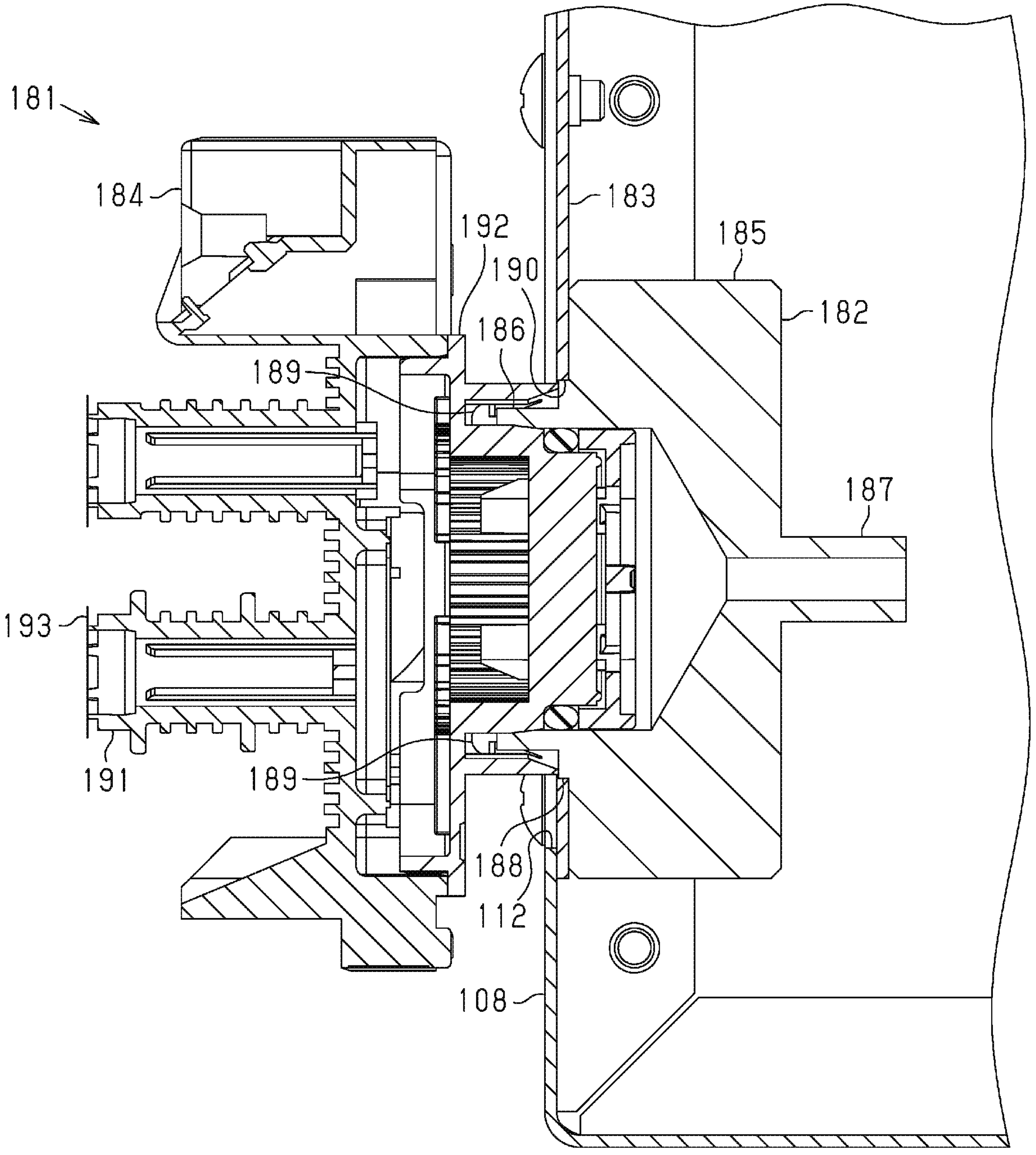
FIG. 22 is a cross-sectional view of a lead out section.

As shown in FIG. 22, the lead out section 181 has a first member 182, a fixed plate 183, and a second member 184. Liquid flows from the container 71 to the coupler 14 by passing through the first member 182 and the second member 184.

The first member 182 is a member attached to the fixed plate 183. The first member 182 has a base portion 185 and an insertion portion 186. The base portion 185 is a portion connected to the lead out tube 174. The base portion 185 has a joint 187. The lead out tube 174 is connected to the joint 187. The base portion 185 is fixed to the fixed plate 183. The insertion portion 186 is a portion extending from the base portion 185. The insertion portion 186 is inserted into the fixed plate 183.

The shape of the insertion portion 186 is cylindrical. The insertion portion 186 has a fitting portion 188. The fitting portion 188 is a portion fitted into the fixed plate 183. The fitting portion 188 is located at the base end of the insertion portion 186.

The insertion portion 186 has a plurality of hooks 189. The plurality of hooks 189 are located at the tip end of the insertion portion 186. The plurality of hooks 189 are members for connecting the first member 182 and the second member 184 together. The first member 182 is connected to the second member 184 by the plurality of hooks 189 which are hooked onto the second member 184.

An insertion opening 190 is opened in the fixed plate 183. The insertion portion 186 is inserted into the insertion opening 190. The diameter of the insertion opening 190 is substantially the same as the diameter of the fitting portion 188. Therefore, when the insertion portion 186 is inserted into the insertion opening 190, the fitting portion 188 fits into the insertion opening 190. Thus, the first member 182 is positioned with respect to the fixed plate 183. The first member 182 is fixed to the fixed plate 183 by screws, for example, in a state where the fitting portion 188 fits into the insertion opening 190. The fixed plate 183 is attached to the attachment plate 108. By this, the lead out section 181 is fixed to the attachment plate 108.

The second member 184 is a member connected to the coupler 14. The second member 184 has an insertion pipe 191 and a coupling portion 192. The coupler 14 is inserted into the insertion pipe 191. Specifically, the introduction member 17 is inserted into the insertion pipe 191. Thereby, liquid is led out from the lead out section 181 to the coupler 14. A film 193 is welded to the tip of the insertion pipe 191. The film 193 is penetrated by the introduction member 17. The coupling portion 192 is a portion connected to the first member 182. The insertion portion 186 is inserted into the coupling portion 192.

Figure 23:
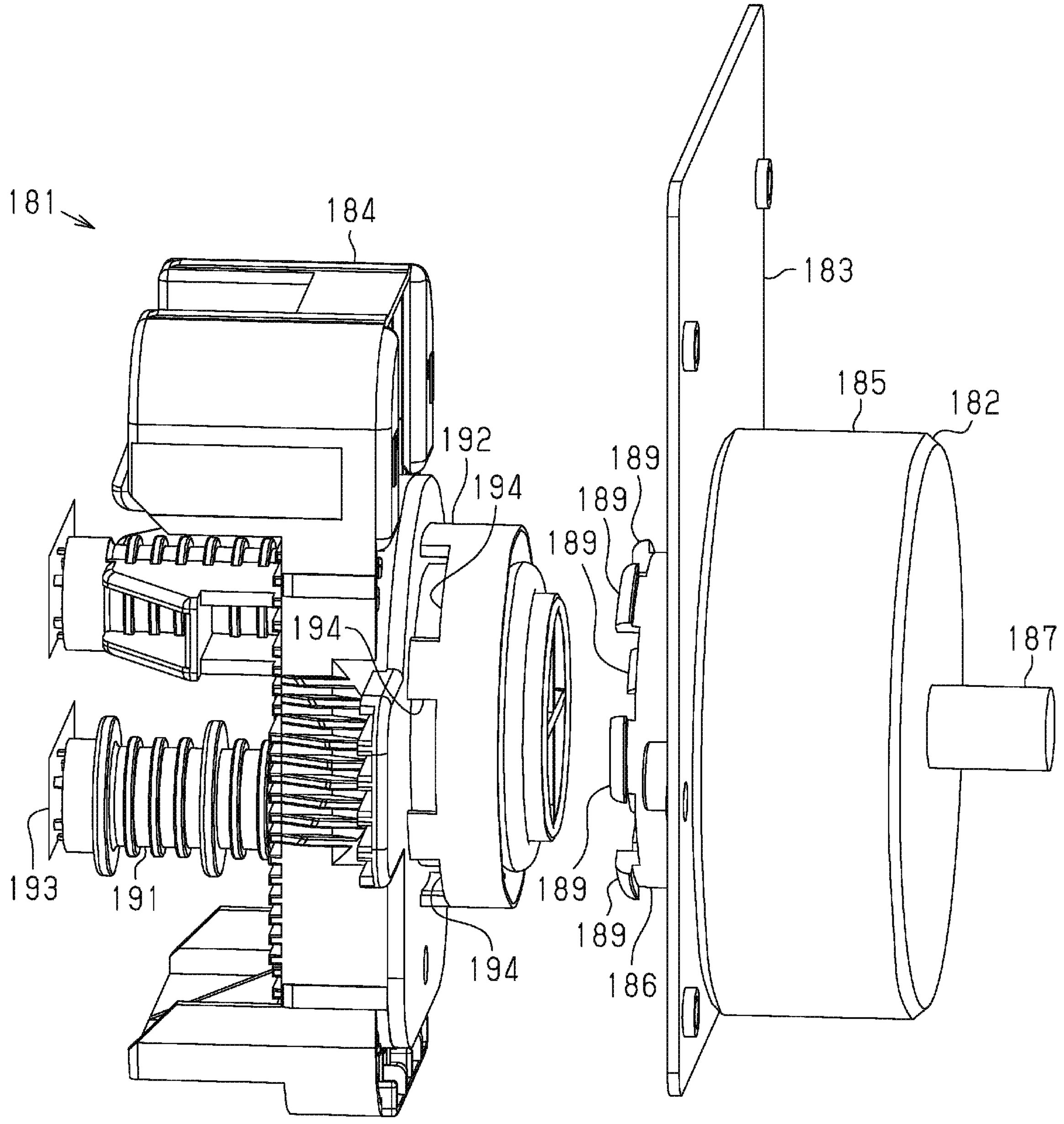
FIG. 23 is an exploded perspective view of the lead out section.
Figure 24:
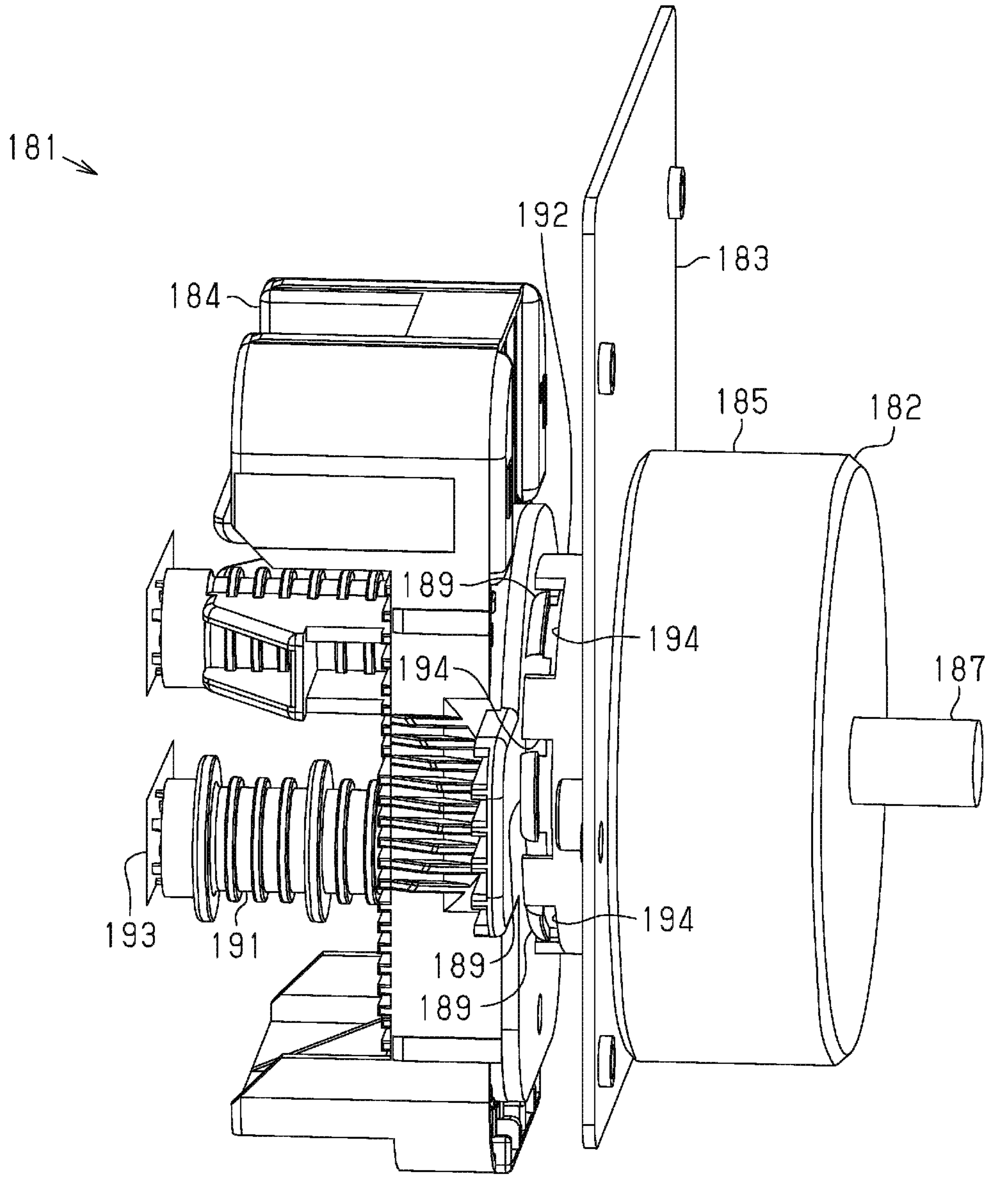
FIG. 24 is a perspective view of the lead out section.

As shown in FIG. 23 and FIG. 24, a plurality of connection openings 194 are formed in the coupling portion 192. The plurality of connection openings 194 correspond to the plurality of hooks 189. When the insertion portion 186 is inserted into the coupling portion 192, the hooks 189 are positioned within the connection openings 194. This causes the hooks 189 to hook onto the coupling portion 192. The hooks 189 hook onto the coupling portion 192, thereby the first member 182 and the second member 184 are connected.

Figure 25:
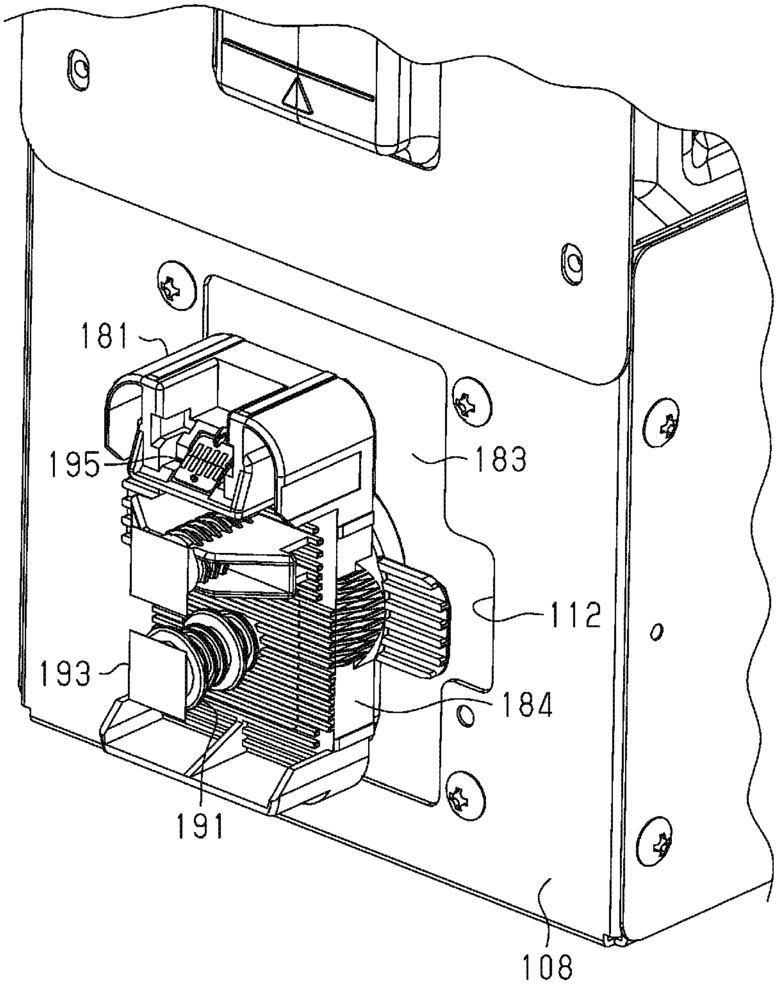
FIG. 25 is an enlarged view of the lead out section shown in FIG. 8.

As shown in FIG. 25, the lead out section 181 has a circuit substrate 195. The circuit substrate 195 is a substrate for detecting a connection between the lead out section 181 and the coupler 14. The circuit substrate 195 is connected to the coupler 14. Specifically, the circuit substrate 195 is connected to the detection member 18. The circuit substrate 195 is attached to the second member 184. The circuit substrate 195 is located above the insertion pipe 191, for example. This reduces a possibility of liquid dripping from the insertion pipe 191 will contact the circuit substrate 195.

Function and Effect

Next, function and effects of the above embodiment will be described.

(1) When the cap 121 seals the inlet 85, the cap 121 and the inlet section 84 constitute an atmospheric release path 128 that connects the inlet 85 to atmosphere. When the cap 121 seals the inlet 85, the atmospheric release path 128 is located at the place which is covered by the cap 121 because the cap 121 and the inlet section 84 configure the atmospheric release path 128. Therefore, according to the above configuration, foreign matter is unlikely to enter through the atmospheric release path 128, compared to a configuration in which the atmospheric release path 128 opens in the upper wall of the container 71, for example.

(2) The atmospheric release path 128 has the through passage 88 that penetrates through the inlet section 84. According to the above configuration, since the cap 121 covers the inlet section 84, foreign matter is unlikely to enter through the through passage 88.

(3) The atmospheric release path 128 has the gap 129 between the inlet section 84 and the cap 121. According to the above configuration, since the cap 121 covers the inlet section 84, foreign matter is unlikely to enter through the gap 129 between the inlet section 84 and the cap 121.

(4) The indication section 131 is located on the cap 121. The user manipulates the cap 121 when introducing liquid. Therefore, the user sees the indication section 131 when introducing liquid. According to the above configuration, the possibility of introducing a different type of liquid that is different from the liquid contained in the container 71 is reduced.

(5) The inlet section 84 is located on the inclined surface 79. The gripping section 94 is located at the same height as the inlet section 84 in the vertical direction. In the container 71, a portion of the container that is at the same height as the inlet section 84 or above the inlet section 84 cannot contain liquid. Therefore, if the inlet section 84 is located on the inclined surface 79, dead space is likely to be generated in the container 71. In this regard, the above configuration reduces the dead space because the gripping section 94 is located at the same height as the inlet section 84.

(6) The surface area of the container 71 that is covered by the cover 102 is smaller than the surface area of the container 71 that is not covered by the cover 102. According to the above configuration, the container 71 is protected by the cover 102 while the container 71 can easily take in outside light. This makes it easier for the user to monitor the amount of liquid contained in the container 71.

(7) The inlet section 84 is located above the visual check section 91 and is vertically aligned with the visual check section 91 when the visual check section 91 is viewed from the front. The cover 102 has the inlet opening 105 into which the inlet section 84 is inserted. According to the above configuration, it is easier for the user to fill liquid while viewing the visual check section 91. Therefore, both protection of the container 71 by the cover 102 and visibility of the liquid level by the visual check section 91 are achieved.

(8) The visual check section 91 protrudes from the front surface 73 of the container 71. The cover 102 has the viewing opening 104 into which the visual check section 91 is inserted. According to the above configuration, it is easy for the user to see the visual check section 91. Therefore, both protection of the container 71 by the cover 102 and visibility of the liquid level by the visual check section 91 are achieved.

(9) The attachment member 122 has the holding portion 126 that holds the lid member 123 in the closed position by contacting the lid member 123. According to the above configuration, the possibility of the lid member 123 being opened unexpectedly is reduced by the holding portion 126 which holds the lid member 123 in the closed state.

Modifications

The above embodiments may be modified as follows. The above embodiments and the following modifications can be implemented in combination with each other to the extent that there is no technical contradiction.

The cover 102 may be fixed to the container 71.

The valve section 142 may be an electromagnetic valve that electrically opens and closes according to the amount of the liquid contained in the container 71. In this case, the liquid accommodation body 12 includes, for example, a sensor that detects the remaining amount of the liquid contained in the container 71. The valve section 142 opens and closes based on the detection result of the sensor.

Technical Ideas

Hereinafter, technical ideas grasped from the above embodiments and modifications, and operations and effects thereof, will be described.

(A) A liquid accommodation body to be connected to the liquid ejection device for ejecting liquid, the liquid accommodation body including a container that has an inlet section with an inlet through which liquid is introduced and that contains the liquid; a cap that seals the inlet by covering the inlet section; and a lead out section that leads liquid to the liquid ejection device, wherein when the cap seals the inlet, the cap and the inlet section configure an atmospheric release path that connects the inlet to atmosphere.

Since the cap and the inlet section configure the atmospheric release path when the cap seals the inlet, the atmospheric release path is located at a place which is covered by the cap. Therefore, according to the above configuration, foreign matter is unlikely to enter through the atmospheric release path, compared to a configuration in which the atmospheric release path opens in the upper wall of the container, for example.

(B) The above liquid accommodation body may be such that the atmospheric release path has a through passage that penetrates through the inlet section. According to the above configuration, since the cap covers the inlet section, foreign matter is unlikely to enter through the through passage.

(C) The above liquid accommodation body may be such that the atmospheric release path has a gap between the inlet section and the cap. According to the above configuration, since the cap covers the inlet section, foreign matter is unlikely to enter through the gap between the inlet section and the cap.

(D) The above liquid accommodation body may further include an indication section that indicates a type of liquid that is introduced through the inlet, wherein the indication section may be located on the cap. The user manipulates the cap when introducing the liquid. Therefore, the user sees the indication section when introducing the liquid. According to the above configuration, a possibility of introducing a different type of liquid that is different from the liquid contained in the container is reduced.

(E) The above liquid accommodation body may be such that the container further has an inclined surface inclining upward and a gripping section to be gripped by a user, wherein the inlet section is located on the inclined surface and the gripping section is located at the same height as the inlet section in the vertical direction.

In the container, a portion of the container that is at the same height as the inlet section or above the inlet section cannot contain liquid. Therefore, if the inlet section is located on the inclined surface, dead space is likely to be generated in the container. In this regard, the above configuration reduces the dead space because the gripping section is located at the same height as the inlet section.

(F) The above liquid accommodation body may further include: a cover that covers a part of the container, wherein the container is configured with a transparent or translucent material, and a surface area of the container that is covered by the cover is smaller than a surface area of the container that is not covered by the cover. According to the above configuration, the container is protected by the cover while the container can easily take in outside light. This makes it easier for the user to monitor the amount of liquid contained in the container.

(G) The above liquid accommodation body may be such that the container has a visual check section that enables a visual check of a liquid level of the liquid contained in the container, the inlet section is located above the visual check section and is vertically aligned with the visual check section as the visual check section is viewed from the front, the cover covers a part of the container so as to expose the visual check section, and the cover has an inlet opening into which the inlet section is inserted. According to the above configuration, it is easier for the user to introduce the liquid while viewing the visual check section. Therefore, both the protection of the container by the cover and the visibility of the liquid level by the visual check section are achieved.

(H) The above liquid accommodation body may be such that the container has a visual check section that enables a visual check of a liquid level of the liquid contained in the container, the visual check section protrudes from a front surface of the container, the cover covers a part of the container so as to expose the inlet, and the cover has a viewing opening into which the visual check section is inserted. According to the above configuration, it is easier for the user to see the visual check section. Therefore, both the protection of the container by the cover and the visibility of the liquid level by the visual check section are achieved.

(I) The above liquid accommodation body may be such that the inlet section is located above the visual check section and is vertically aligned with the visual check section as the visual check section is viewed from the front, the cover has an inlet opening into which the inlet section is inserted. According to the above configuration, it is easier for the user to introduce liquid while viewing the visual check section. Therefore, the protection of the container by the cover and the easiness of introducing the liquid through the inlet section are achieved at the same time.

(J) The above liquid accommodation body may be such that the cap further includes an attachment member that is attached to the inlet section, a lid member that is attached to the attachment member and that opens and closes with respect to the inlet section, and a pressing member that presses the lid member so as to open the lid member, wherein the attachment member has the holding portion that holds the lid member in a closed position by contacting the lid member. According to the above configuration, since the holding portion holds the lid member in the closed state, the possibility that the cover member opens unexpectedly is reduced.

What is claimed is:

1. A liquid accommodation body to be connected to a liquid ejection device for ejecting liquid, the liquid accommodation body comprising:

a container that has an inlet section with an inlet through which liquid is introduced and that contains the liquid;

a cap that seals the inlet by covering the inlet section; and a lead out section that leads liquid to the liquid ejection device, wherein when the cap seals the inlet, the cap and the inlet section form an atmospheric release path that connects the inlet to atmosphere.

2. The liquid accommodation body according to claim 1, wherein the atmospheric release path has a through passage that penetrates through the inlet section.

3. The liquid accommodation body according to claim 2, wherein the atmospheric release path has a gap between the inlet section and the cap.

4. The liquid accommodation body according to claim 1 further comprising:

an indication section that indicates a type of liquid that is introduced through the inlet, wherein the indication section is located on the cap.

5. The liquid accommodation body according to claim 1, wherein the container further has an inclined surface inclining upward and a gripping section to be gripped by a user, wherein the inlet section is located on the inclined surface and the gripping section is located at the same height as the inlet section in the vertical direction.

6. The liquid accommodation body according to claim 1, further comprising:

a cover that covers a part of the container, wherein the container is configured with a transparent or translucent material and a surface area of the container that is covered by the cover is smaller than a surface area of the container that is not covered by the cover.

7. The liquid accommodation body according to claim 6, wherein the container has a visual check section that enables a visual check of a liquid level of the liquid contained in the container, the inlet section is located above the visual check section and is vertically aligned with the visual check section as the visual check section is viewed from the front, the cover covers a part of the container so as to expose the visual check section, and the cover has an inlet opening into which the inlet section is inserted.

8. The liquid accommodation body according to claim 6, wherein the container has a visual check section that enables a visual check of a liquid level of the liquid contained in the container, the visual check section protrudes from a front surface of the container, the cover covers a part of the container so as to expose the inlet, and the cover has a viewing opening into which the visual check section is inserted.

9. The liquid accommodation body according to claim 8, wherein the inlet section is located above the visual check section and is vertically aligned with the visual check section as the visual check section is viewed from the front, and the cover has an inlet opening into which the inlet section is inserted.

10. The liquid accommodation body according to claim 1, wherein the cap further includes an attachment member that is attached to the inlet section, a lid member that is attached to the attachment member and that opens and closes with respect to the inlet section, and a pressing member that presses the lid member so as to open the lid member, wherein the attachment member has the holding portion that holds the lid member in a closed position by contacting the lid member.

* * * * *